US008654917B2

(12) United States Patent
Bashkirtsev et al.

(10) Patent No.: US 8,654,917 B2
(45) Date of Patent: Feb. 18, 2014

(54) NUCLEAR REACTOR (ALTERNATIVES), FUEL ASSEMBLY OF SEED-BLANKET SUBASSEMBLIES FOR NUCLEAR REACTOR (ALTERNATIVES), AND FUEL ELEMENT FOR FUEL ASSEMBLY

(75) Inventors: Sergey Mikhailovich Bashkirtsev, Moscow (RU); Valentin Fedorovich Kuznetsov, Moscow (RU); Valery Vladimirovich Kevrolev, Moscow (RU); Alexei Glebovich Morozov, Moscow (RU); Michael H. Montgomery, Hamilton, VA (US)

(73) Assignee: Thorium Power, Inc., McLean, VA (US)

( * ) Notice: Subject to any disclaimer, the term of this patent is extended or adjusted under 35 U.S.C. 154(b) by 620 days.

(21) Appl. No.: 13/047,168

(22) Filed: Mar. 14, 2011

(65) Prior Publication Data

US 2011/0255651 A1 Oct. 20, 2011

Related U.S. Application Data

(63) Continuation-in-part of application No. 12/340,833, filed on Dec. 22, 2008, now Pat. No. 8,116,423, and a continuation-in-part of application No. PCT/RU2008/000801, filed on Dec. 25, 2008.

(60) Provisional application No. 61/116,730, filed on Nov. 21, 2008, provisional application No. 61/432,741, filed on Jan. 14, 2011, provisional application No. 61/333,467, filed on May 11, 2010, provisional application No. 61/393,499, filed on Oct. 15, 2010, provisional application No. 61/444,990, filed on Feb. 21, 2011.

(51) Int. Cl.
*G21C 3/06* (2006.01)
*G21C 3/32* (2006.01)
*G21C 21/00* (2006.01)
*G21C 3/00* (2006.01)

(52) U.S. Cl.
USPC ........... 376/412; 376/409; 376/426; 376/434; 376/453; 376/454; 376/455

(58) Field of Classification Search
USPC ................. 376/171–173, 409, 434, 426, 428, 376/453–455, 412–425; 427/5, 6
See application file for complete search history.

(56) References Cited

U.S. PATENT DOCUMENTS 2,780,517 A 2/1957 Fontana
2,879,216 A 3/1959 Hurwitz, Jr. et al.

(Continued)

FOREIGN PATENT DOCUMENTS

DE 1464481 1/1969
DE 1514124 9/1969

(Continued)

OTHER PUBLICATIONS

International Preliminary Report on Patentability for PCT/US2011-035859, mailed Nov. 22, 2012.

(Continued)

*Primary Examiner* — Bernarr Gregory
(74) *Attorney, Agent, or Firm* — Pillsbury Winthrop Shaw Pittman, LLP

(57) ABSTRACT

Fuel elements are supported by fuel assemblies configured for use in land-based nuclear reactors such as the VVER-1000. The fuel elements include a kernel having a multi-lobed profile that forms spiral ribs that include fissionable material (e.g., uranium or plutonium), a central metal displacer extending along a longitudinal axis of the kernel, and a metal cladding (e.g., zirconium and/or other refractory metals) enclosing the kernel. The fuel element may be fabricated by joint extrusion of the displacer, kernel, and cladding through a die to metallurgically bond the kernel and cladding.

29 Claims, 14 Drawing Sheets

(56) References Cited

U.S. PATENT DOCUMENTS

| | | | |
|---|---|---|---|
| 2,887,357 A | 5/1959 | Seaborg et al. | |
| 2,894,827 A | 7/1959 | Hyde et al. | |
| 2,898,185 A | 8/1959 | Boyd et al. | |
| 2,902,422 A * | 9/1959 | Hutter | 376/434 |
| 3,009,869 A * | 11/1961 | Bassett | 376/419 |
| 3,022,240 A * | 2/1962 | Bassett | 376/423 |
| 3,030,291 A | 4/1962 | Butler et al. | |
| 3,034,975 A | 5/1962 | Beurtheret | |
| 3,046,088 A | 7/1962 | Horn | |
| 3,063,925 A | 11/1962 | Huet | |
| 3,070,527 A | 12/1962 | Hurford et al. | |
| 3,088,900 A | 5/1963 | Brown et al. | |
| 3,096,264 A | 7/1963 | Bauer | |
| 3,105,035 A | 9/1963 | Weems | |
| 3,133,867 A | 5/1964 | Frisch | |
| 3,154,471 A | 10/1964 | Radkowsky | |
| 3,177,123 A | 4/1965 | Huet | |
| 3,197,383 A | 7/1965 | Maillet | |
| 3,208,912 A | 9/1965 | Jaye et al. | |
| 3,219,535 A | 11/1965 | Robbins | |
| 3,247,077 A * | 4/1966 | Boudouresques | 376/453 |
| 3,275,525 A * | 9/1966 | Bloomster et al. | 376/428 |
| 3,275,564 A | 9/1966 | Pascard | |
| 3,282,335 A | 11/1966 | De Haller | |
| 3,285,825 A | 11/1966 | Jens | |
| 3,297,544 A * | 1/1967 | Hooper et al. | 376/419 |
| 3,308,033 A | 3/1967 | Alfille et al. | |
| 3,309,277 A | 3/1967 | Jaye et al. | |
| 3,310,474 A * | 3/1967 | Saunders | 376/412 |
| 3,322,644 A | 5/1967 | Benson | |
| 3,335,060 A | 8/1967 | Diener | |
| 3,339,631 A | 9/1967 | McGurty et al. | |
| 3,361,640 A | 1/1968 | Hassig et al. | |
| 3,366,547 A | 1/1968 | Gumuchian et al. | |
| 3,378,453 A | 4/1968 | Gorker | |
| 3,394,049 A | 7/1968 | Jones | |
| 3,486,973 A | 12/1969 | Georges et al. | |
| 3,546,068 A | 12/1970 | Schluderberg | |
| 3,567,582 A | 3/1971 | Van Dievoet et al. | |
| 3,577,225 A | 5/1971 | Shaffer et al. | |
| 3,640,844 A | 2/1972 | Shank et al. | |
| 3,660,227 A | 5/1972 | Ackroyd et al. | |
| 3,660,228 A | 5/1972 | Magladry | |
| 3,671,392 A | 6/1972 | Beaudoin et al. | |
| 3,714,322 A | 1/1973 | Bell et al. | |
| 3,736,227 A | 5/1973 | Nakazato | |
| 3,801,734 A | 4/1974 | West | |
| 3,814,667 A | 6/1974 | Klumb et al. | |
| 3,847,736 A | 11/1974 | Bevilacqua | |
| 3,853,703 A | 12/1974 | Anthony et al. | |
| 3,859,165 A | 1/1975 | Radkowsky et al. | |
| 3,956,147 A | 5/1976 | Becker et al. | |
| 3,957,575 A | 5/1976 | Fauth | |
| T947,011 I4 | 6/1976 | Radkowsky | |
| 3,960,655 A | 6/1976 | Bohanan et al. | |
| 3,971,575 A | 7/1976 | Lesham et al. | |
| 3,998,692 A | 12/1976 | Bohanan et al. | |
| 4,029,740 A | 6/1977 | Ervin, Jr. | |
| 4,072,564 A | 2/1978 | Jabsen | |
| 4,077,835 A | 3/1978 | Bishop et al. | |
| 4,078,967 A | 3/1978 | Anthony | |
| 4,111,348 A | 9/1978 | Laird et al. | |
| 4,119,563 A | 10/1978 | Kadner et al. | |
| 4,192,716 A | 3/1980 | Anthony | |
| 4,193,953 A | 3/1980 | Langen et al. | |
| 4,194,948 A | 3/1980 | Ledin | |
| 4,202,793 A | 5/1980 | Bezzi et al. | |
| 4,235,669 A | 11/1980 | Burgess et al. | |
| 4,268,357 A | 5/1981 | Formanek | |
| 4,273,613 A | 6/1981 | Radkowsky | |
| 4,278,501 A | 7/1981 | Steinke | |
| 4,285,771 A | 8/1981 | Downs | |
| 4,292,278 A | 9/1981 | Elikan et al. | |
| 4,298,434 A | 11/1981 | Anthony et al. | |
| 4,304,631 A | 12/1981 | Walton et al. | |
| 4,309,251 A | 1/1982 | Anthony et al. | |
| 4,320,093 A | 3/1982 | Volesky et al. | |
| 4,324,618 A | 4/1982 | Schluderberg | |
| 4,344,912 A | 8/1982 | Rampolla | |
| 4,381,284 A | 4/1983 | Gjertsen | |
| 4,393,510 A | 7/1983 | Lang et al. | |
| RE31,583 E | 5/1984 | Klumb et al. | |
| 4,450,016 A | 5/1984 | Vesterlund et al. | |
| 4,450,020 A | 5/1984 | Vesterlund | |
| 4,474,398 A | 10/1984 | Tolino et al. | |
| 4,495,136 A | 1/1985 | Camden, Jr. et al. | |
| 4,499,047 A | 2/1985 | Borrman et al. | |
| 4,508,679 A | 4/1985 | Matzner et al. | |
| 4,540,545 A | 9/1985 | Kondo | |
| 4,544,522 A | 10/1985 | Curulla et al. | |
| 4,551,300 A | 11/1985 | Feutrel | |
| 4,560,532 A | 12/1985 | Barry et al. | |
| 4,572,816 A | 2/1986 | Gjertsen | |
| 4,578,240 A | 3/1986 | Cadwell | |
| 4,579,711 A | 4/1986 | Mishima et al. | |
| 4,584,167 A | 4/1986 | Carelli | |
| 4,587,078 A | 5/1986 | Azekura et al. | |
| 4,589,929 A | 5/1986 | Steinberg | |
| 4,615,862 A | 10/1986 | Huckestein | |
| 4,645,642 A | 2/1987 | Leclercq et al. | |
| 4,652,425 A | 3/1987 | Ferrari et al. | |
| 4,659,538 A | 4/1987 | Leclercq | |
| 4,664,880 A | 5/1987 | Bryan | |
| 4,666,664 A | 5/1987 | Doshi | |
| 4,670,213 A | 6/1987 | Wilson et al. | |
| 4,671,924 A | 6/1987 | Gjertsen et al. | |
| 4,671,927 A | 6/1987 | Alsop | |
| 4,678,619 A | 7/1987 | Radkowsky | |
| 4,678,627 A | 7/1987 | Rylatt | |
| 4,678,632 A | 7/1987 | Ferrari | |
| 4,680,443 A | 7/1987 | Vere et al. | |
| 4,684,495 A | 8/1987 | Wilson et al. | |
| 4,684,503 A | 8/1987 | Shallenberger | |
| 4,692,304 A | 9/1987 | Gjertsen | |
| 4,699,758 A | 10/1987 | Shallenberger et al. | |
| 4,699,761 A | 10/1987 | Gjertsen et al. | |
| 4,702,883 A | 10/1987 | Wilson et al. | |
| 4,716,015 A | 12/1987 | Carlson | |
| 4,746,488 A | 5/1988 | Pradal et al. | |
| 4,749,519 A | 6/1988 | Koehly et al. | |
| 4,762,676 A | 8/1988 | Gjertsen et al. | |
| 4,765,909 A | 8/1988 | Rourke et al. | |
| 4,818,474 A | 4/1989 | Malhouitre et al. | |
| 4,820,473 A | 4/1989 | Ohashi et al. | |
| 4,828,792 A | 5/1989 | Leclercq et al. | |
| 4,832,905 A | 5/1989 | Bryan et al. | |
| 4,842,814 A | 6/1989 | Takase et al. | |
| 4,859,400 A | 8/1989 | Curzon | |
| 4,879,086 A | 11/1989 | Luce et al. | |
| 4,880,607 A | 11/1989 | Horton et al. | |
| 4,900,507 A | 2/1990 | Shallenberger et al. | |
| 4,918,710 A | 4/1990 | Bard | |
| 4,938,921 A | 7/1990 | Mardon et al. | |
| 4,942,016 A | 7/1990 | Marlowe et al. | |
| 4,954,293 A | 9/1990 | Cailly et al. | |
| 4,957,695 A | 9/1990 | Rudolph | |
| 4,968,476 A | 11/1990 | Radkowsky | |
| 4,986,957 A | 1/1991 | Taylor | |
| 4,986,960 A | 1/1991 | Larson | |
| 4,997,596 A | 3/1991 | Proebstle et al. | |
| 5,002,726 A | 3/1991 | Johansson | |
| 5,009,837 A | 4/1991 | Nguyen et al. | |
| 5,019,327 A | 5/1991 | Fanning et al. | |
| 5,019,333 A | 5/1991 | Isobe et al. | |
| 5,024,426 A | 6/1991 | Busch et al. | |
| 5,024,807 A | 6/1991 | Hatfield et al. | |
| 5,024,809 A | 6/1991 | Taylor | |
| 5,024,810 A | 6/1991 | Bachman | |
| 5,026,516 A | 6/1991 | Taylor | |
| 5,030,412 A | 7/1991 | Yates et al. | |
| 5,032,351 A | 7/1991 | Johansson | |
| 5,035,869 A | 7/1991 | Furuya | |
| 5,037,605 A | 8/1991 | Riordan, III | |
| 5,053,191 A | 10/1991 | Bryan et al. | |

| Patent No. | Date | Inventor |
|---|---|---|
| 5,069,864 A | 12/1991 | Johansson |
| 5,073,336 A | 12/1991 | Taylor |
| 5,085,827 A | 2/1992 | Johansson et al. |
| 5,089,210 A | 2/1992 | Reese et al. |
| 5,089,220 A | 2/1992 | Nylund |
| 5,089,221 A | 2/1992 | Johansson et al. |
| 5,091,145 A | 2/1992 | Petit |
| 5,093,075 A | 3/1992 | Chevereau et al. |
| 5,094,802 A | 3/1992 | Riordan, III |
| 5,110,539 A | 5/1992 | Perrotti et al. |
| 5,112,571 A | 5/1992 | Orii et al. |
| 5,135,710 A | 8/1992 | Grattier et al. |
| 5,135,728 A | 8/1992 | Karraker |
| 5,136,619 A | 8/1992 | Capossela et al. |
| 5,141,701 A | 8/1992 | Bryan |
| 5,147,597 A | 9/1992 | Roofthooft et al. |
| 5,147,600 A | 9/1992 | Kadono et al. |
| 5,149,491 A | 9/1992 | Congdon et al. |
| 5,164,050 A | 11/1992 | Bertaud et al. |
| 5,183,629 A | 2/1993 | Canat et al. |
| 5,186,891 A | 2/1993 | Johansson et al. |
| 5,188,797 A | 2/1993 | Bryan |
| 5,192,495 A | 3/1993 | Caldwell et al. |
| 5,194,216 A | 3/1993 | McDaniels, Jr. |
| 5,200,142 A | 4/1993 | DeMario et al. |
| 5,202,085 A | 4/1993 | Aoyama et al. |
| 5,209,899 A | 5/1993 | Johansson et al. |
| 5,211,908 A | 5/1993 | Verdier |
| 5,219,519 A | 6/1993 | Matzner |
| 5,221,515 A | 6/1993 | Thiebaut et al. |
| 5,223,211 A | 6/1993 | Inagaki et al. |
| 5,241,570 A | 8/1993 | Challberg |
| 5,243,635 A | 9/1993 | Bryan |
| 5,247,550 A | 9/1993 | Perkins et al. |
| 5,259,009 A | 11/1993 | Patterson et al. |
| 5,259,010 A | 11/1993 | Brown et al. |
| 5,263,071 A | 11/1993 | Farkas et al. |
| 5,265,139 A | 11/1993 | Yanagi et al. |
| 5,267,291 A | 11/1993 | Matzner et al. |
| 5,271,053 A | 12/1993 | Bryan |
| 5,272,741 A | 12/1993 | Masuhara et al. |
| 5,272,742 A | 12/1993 | Attix et al. |
| 5,274,685 A | 12/1993 | Yates |
| 5,276,721 A | 1/1994 | Beuerlein |
| 5,278,882 A | 1/1994 | Garde et al. |
| 5,278,883 A | 1/1994 | Patterson et al. |
| 5,282,231 A | 1/1994 | Adams et al. |
| 5,283,812 A | 2/1994 | Verdier |
| 5,283,821 A | 2/1994 | Karoutas |
| 5,286,946 A | 2/1994 | Will |
| 5,289,514 A | 2/1994 | Lippert et al. |
| 5,297,176 A | 3/1994 | Altman et al. |
| 5,297,177 A | 3/1994 | Inagaki et al. |
| 5,299,246 A | 3/1994 | Bryan |
| 5,301,218 A | 4/1994 | Taylor, Jr. et al. |
| 5,307,393 A | 4/1994 | Hatfield |
| 5,328,524 A | 7/1994 | Hertz |
| 5,340,447 A | 8/1994 | Bertaud et al. |
| 5,341,407 A | 8/1994 | Rosenbaum et al. |
| 5,345,483 A | 9/1994 | Johansson et al. |
| 5,347,560 A | 9/1994 | Lippert et al. |
| 5,349,618 A | 9/1994 | Greenspan |
| 5,373,541 A | 12/1994 | Mardon et al. |
| 5,375,154 A | 12/1994 | Matzner et al. |
| 5,383,228 A | 1/1995 | Armijo et al. |
| 5,384,814 A | 1/1995 | Matzner et al. |
| 5,386,439 A | 1/1995 | Leroy et al. |
| 5,386,440 A | 1/1995 | Kashiwai et al. |
| 5,390,220 A | 2/1995 | Zuloaga, Jr. et al. |
| 5,390,221 A | 2/1995 | Dix et al. |
| 5,390,222 A | 2/1995 | Rau et al. |
| 5,403,565 A | 4/1995 | Delloye et al. |
| 5,404,383 A | 4/1995 | Nylund |
| 5,417,780 A | 5/1995 | Adamson et al. |
| 5,420,901 A | 5/1995 | Johansson |
| 5,420,902 A | 5/1995 | Dressel et al. |
| 5,434,897 A | 7/1995 | Davies |
| 5,434,898 A | 7/1995 | Barkhurst |
| 5,436,946 A | 7/1995 | Curulla et al. |
| 5,436,947 A | 7/1995 | Taylor |
| 5,437,747 A | 8/1995 | Adamson et al. |
| 5,438,598 A | 8/1995 | Attix |
| 5,440,599 A | 8/1995 | Rodack et al. |
| 5,444,748 A | 8/1995 | Beuchel et al. |
| 5,452,334 A | 9/1995 | Reparaz et al. |
| 5,469,481 A | 11/1995 | Adamson et al. |
| 5,473,650 A | 12/1995 | Johansson |
| 5,481,577 A | 1/1996 | Yates et al. |
| 5,481,578 A | 1/1996 | Matzner |
| 5,483,564 A | 1/1996 | Matzner et al. |
| 5,488,634 A | 1/1996 | Johansson et al. |
| 5,488,644 A | 1/1996 | Johansson |
| 5,490,189 A | 2/1996 | Schechter |
| 5,490,190 A | 2/1996 | Hopkins et al. |
| 5,517,540 A | 5/1996 | Marlowe et al. |
| 5,517,541 A | 5/1996 | Rosenbaum et al. |
| 5,519,745 A | 5/1996 | Proebstle et al. |
| 5,519,746 A | 5/1996 | Dalke et al. |
| 5,519,748 A | 5/1996 | Adamson et al. |
| 5,524,032 A | 6/1996 | Adamson et al. |
| 5,526,387 A | 6/1996 | Johansson et al. |
| 5,528,640 A | 6/1996 | Johansson et al. |
| 5,530,729 A | 6/1996 | Gustafsson |
| 5,538,701 A | 7/1996 | Avens et al. |
| 5,539,791 A | 7/1996 | Garzarolli et al. |
| 5,539,792 A | 7/1996 | Buttner et al. |
| 5,539,793 A | 7/1996 | Johansson et al. |
| 5,546,437 A | 8/1996 | Matzner et al. |
| 5,572,560 A | 11/1996 | Brown |
| 5,577,081 A | 11/1996 | Yaginuma |
| 5,578,145 A | 11/1996 | Adamson et al. |
| 5,596,615 A | 1/1997 | Nakamura et al. |
| 5,600,694 A | 2/1997 | Broders |
| 5,606,724 A | 2/1997 | Wai et al. |
| 5,609,697 A | 3/1997 | Moinard et al. |
| 5,618,356 A | 4/1997 | Adamson et al. |
| 5,620,536 A | 4/1997 | Dahlback |
| 5,622,574 A | 4/1997 | Charquet |
| 5,648,995 A | 7/1997 | Mardon et al. |
| 5,666,389 A | 9/1997 | Andersson et al. |
| 5,674,330 A | 10/1997 | Charquet et al. |
| 5,675,621 A | 10/1997 | Croteau et al. |
| 5,681,404 A | 10/1997 | Adamson et al. |
| 5,699,396 A | 12/1997 | Taylor |
| 5,702,544 A | 12/1997 | Mardon et al. |
| 5,711,826 A | 1/1998 | Nordstrom |
| 5,726,418 A | 3/1998 | Duthoo |
| 5,727,039 A | 3/1998 | Harmon et al. |
| 5,732,116 A | 3/1998 | Petit |
| 5,737,375 A | 4/1998 | Radkowsky |
| 5,740,218 A | 4/1998 | Frederickson et al. |
| 5,748,694 A | 5/1998 | King |
| 5,768,332 A | 6/1998 | Van Swam |
| 5,774,514 A | 6/1998 | Rubbia |
| 5,774,517 A | 6/1998 | Palavecino et al. |
| 5,778,035 A | 7/1998 | Nylund |
| 5,787,142 A | 7/1998 | Van Swam |
| 5,808,271 A | 9/1998 | Duthoo |
| 5,826,163 A | 10/1998 | Saraceno et al. |
| 5,832,050 A | 11/1998 | Rebeyrolle et al. |
| 5,838,753 A | 11/1998 | Van Swam et al. |
| 5,844,957 A | 12/1998 | Johannesson et al. |
| 5,852,645 A | 12/1998 | Romary et al. |
| 5,854,818 A | 12/1998 | Van Swam et al. |
| 5,859,887 A | 1/1999 | Richards |
| 5,864,593 A | 1/1999 | Radkowsky |
| 5,892,807 A | 4/1999 | Van Swam |
| 5,901,193 A | 5/1999 | Dahlback et al. |
| 5,926,517 A | 7/1999 | Van Swam |
| 5,940,464 A | 8/1999 | Mardon et al. |
| 5,949,837 A | 9/1999 | Radkowsky |
| 5,949,839 A | 9/1999 | Nylund |
| 6,002,735 A | 12/1999 | Van Swam |
| 6,010,671 A | 1/2000 | Kimura |
| 6,026,136 A | 2/2000 | Radkowsky |
| 6,033,493 A | 3/2000 | Hertz et al. |
| 6,110,437 A | 8/2000 | Schall et al. |

| | | |
|---|---|---|
| 6,130,927 A | 10/2000 | Kang et al. |
| 6,167,105 A | 12/2000 | Yoon et al. |
| 6,192,098 B1 | 2/2001 | Van Swam |
| 6,205,196 B1 | 3/2001 | Yamashita et al. |
| 6,226,342 B1 | 5/2001 | Micko et al. |
| 6,228,337 B1 | 5/2001 | Ioffe |
| 6,229,868 B1 | 5/2001 | Nylund et al. |
| 6,236,702 B1 | 5/2001 | Chun et al. |
| 6,243,433 B1 | 6/2001 | Adamson et al. |
| 6,278,757 B1 | 8/2001 | Yokomizo et al. |
| 6,278,759 B1 | 8/2001 | Yoon et al. |
| 6,310,931 B1 | 10/2001 | Gustafsson et al. |
| 6,320,924 B1 | 11/2001 | Croteau |
| 6,327,324 B2 | 12/2001 | Nylund |
| 6,339,205 B1 | 1/2002 | Nakayama |
| 6,385,271 B2 | 5/2002 | Nylund |
| 6,393,087 B1 | 5/2002 | Oh et al. |
| 6,400,788 B1 | 6/2002 | Hirano et al. |
| 6,421,407 B1 | 7/2002 | Kang et al. |
| 6,429,403 B1 | 8/2002 | Nakayama |
| 6,473,482 B1 | 10/2002 | Steinke |
| 6,488,783 B1 | 12/2002 | King et al. |
| 6,516,043 B1 | 2/2003 | Chaki et al. |
| 6,519,309 B1 | 2/2003 | Van Swam |
| 6,522,710 B2 | 2/2003 | Smith et al. |
| 6,539,073 B1 | 3/2003 | Smith et al. |
| 6,542,566 B2 | 4/2003 | Adamson et al. |
| 6,542,567 B1 | 4/2003 | Mayet et al. |
| 6,544,361 B1 | 4/2003 | Diz et al. |
| 6,608,880 B2 | 8/2003 | Smith et al. |
| 6,608,881 B2 | 8/2003 | Oh et al. |
| 6,621,885 B2 | 9/2003 | Brichet |
| 6,665,366 B2 | 12/2003 | Aujollet et al. |
| 6,690,758 B1 | 2/2004 | Elkins |
| 6,707,872 B2 | 3/2004 | Yoon et al. |
| 6,714,619 B2 | 3/2004 | Oh et al. |
| 6,721,384 B2 | 4/2004 | Oh et al. |
| 6,728,329 B2 | 4/2004 | Hirano et al. |
| 6,744,842 B2 | 6/2004 | Schmidt et al. |
| 6,758,917 B2 | 7/2004 | King et al. |
| 6,807,246 B1 | 10/2004 | Kim et al. |
| 6,819,733 B2 | 11/2004 | Broders et al. |
| 6,845,138 B2 | 1/2005 | Chun et al. |
| 6,847,695 B2 | 1/2005 | Kageyama et al. |
| 6,863,745 B1 | 3/2005 | Charquet et al. |
| 6,884,304 B1 | 4/2005 | Charquet |
| 6,888,911 B2 | 5/2005 | Stabel-Weinheimer et al. |
| 6,888,912 B2 | 5/2005 | Morel et al. |
| 6,901,128 B2 | 5/2005 | Mori et al. |
| 6,909,766 B2 | 6/2005 | Kido et al. |
| 6,925,138 B2 | 8/2005 | Nakamaru et al. |
| 6,934,350 B1 | 8/2005 | Challberg et al. |
| 6,943,315 B2 | 9/2005 | Cho et al. |
| 6,960,326 B1 | 11/2005 | Webb et al. |
| 6,991,731 B2 | 1/2006 | Koegler |
| 7,037,390 B2 | 5/2006 | Miyahara et al. |
| 7,085,340 B2 | 8/2006 | Goldenfield et al. |
| 7,087,206 B2 | 8/2006 | Bond et al. |
| 7,127,024 B2 | 10/2006 | Garzarolli et al. |
| 7,169,370 B2 | 1/2007 | Mesmin et al. |
| 7,192,563 B2 | 3/2007 | Singh et al. |
| 7,195,745 B2 | 3/2007 | Brandel et al. |
| 7,309,473 B2 | 12/2007 | Caranoni et al. |
| 7,323,153 B2 | 1/2008 | Amamoto et al. |
| 8,116,423 B2 * | 2/2012 | Bashkirtsev et al. ......... 376/412 |
| 2002/0122762 A1 | 9/2002 | Fukasawa et al. |
| 2003/0026381 A1 | 2/2003 | Ukai et al. |
| 2005/0031067 A1 | 2/2005 | Mori et al. |
| 2005/0069075 A1 | 3/2005 | D'Auvergne |
| 2005/0105677 A1 | 5/2005 | Yoon et al. |
| 2005/0157836 A1 | 7/2005 | Broach et al. |
| 2005/0226358 A1 | 10/2005 | Bonnamour et al. |
| 2005/0238131 A1 | 10/2005 | Hellandbrand, Jr. et al. |
| 2006/0045231 A1 | 3/2006 | Lee et al. |
| 2006/0153327 A1 | 7/2006 | Jiang |
| 2006/0171498 A1 | 8/2006 | D'Auvergne |
| 2006/0233685 A1 | 10/2006 | Janes |
| 2006/0251205 A1 | 11/2006 | Balog |
| 2006/0283790 A1 | 12/2006 | Elkins et al. |
| 2007/0036260 A1 | 2/2007 | Fetterman et al. |
| 2007/0080328 A1 | 4/2007 | Zavodchikov et al. |
| 2007/0133734 A1 | 6/2007 | Fawcett et al. |
| 2007/0165766 A1 | 7/2007 | Aleshin et al. |
| 2007/0183556 A1 | 8/2007 | Labarriere et al. |
| 2007/0201605 A1 | 8/2007 | Ishii et al. |
| 2007/0206717 A1 | 9/2007 | Conner et al. |
| 2007/0211843 A1 | 9/2007 | Smith, III et al. |
| 2007/0242793 A1 | 10/2007 | Song et al. |
| 2008/0013667 A1 | 1/2008 | Oh et al. |
| 2008/0130820 A1 | 6/2008 | Ukai et al. |
| 2008/0144762 A1 | 6/2008 | Holden et al. |
| 2008/0152068 A1 | 6/2008 | Aktas et al. |
| 2008/0152069 A1 | 6/2008 | Aktas et al. |
| 2008/0179042 A1 | 7/2008 | Evans et al. |
| 2009/0252278 A1 | 10/2009 | Bashkirtsev et al. |

FOREIGN PATENT DOCUMENTS

| | | |
|---|---|---|
| EP | 0080853 | 6/1983 |
| EP | 0620558 | 4/1994 |
| EP | 0871958 | 10/1998 |
| FR | 1444002 | 7/1966 |
| FR | 2632657 | 12/1989 |
| GB | 853511 | 11/1960 |
| GB | 876399 | 8/1961 |
| GB | 904140 | 8/1962 |
| GB | 1031678 | 6/1966 |
| GB | 1043782 | 9/1966 |
| GB | 1068964 | 5/1967 |
| GB | 1126396 | 9/1968 |
| GB | 1282767 | 7/1972 |
| GB | 2229172 | 9/1990 |
| JP | 59-23830 | 2/1984 |
| JP | 63-134520 | 6/1988 |
| JP | 2018328 | 1/1990 |
| JP | 221893 | 11/1990 |
| JP | 3094195 | 4/1991 |
| JP | 2003-248079 | 9/2003 |
| JP | 2004-20463 | 1/2004 |
| KR | 10-2010-0129798 A | 12/2010 |
| RU | 2170956 | 7/2001 |
| RU | 2176826 | 12/2001 |
| RU | 2222837 | 1/2004 |
| RU | 2246142 | 2/2005 |
| RU | 2389089 | 5/2010 |
| WO | 85/01826 | 4/1985 |
| WO | 97/16477 | 8/1993 |
| WO | 97/08711 | 3/1997 |
| WO | 2010/074592 A1 | 7/2010 |

OTHER PUBLICATIONS

International Search Report and Written Opinion for PCT International Patent Application No. PCT/US2012/020878, mailed on Mar. 27, 2012.

International Search Report and Written Opinion from European Patent Office in Patent Application PCT/US2011/035859 mailed Sep. 21, 2011.

International Search Report and Written Opinion from European Patent Office in Patent Application PCT/US2011/036034 mailed Sep. 21, 2011.

V.V. Bol'Shakov et al., "Experimental study of burnout in channels with twisted fuel rods" *Thermal Engineering*, vol. 54, No. 5, May 1, 2007, pp. 386-389.

International Search Report from Russian Patent Office in Patent Application PCT/RU2007/000732 mailed Jul. 10, 2008.

European Search Report from Patent Application EP08172834 mailed Aug. 19, 2009.

Diakov, C., Feasibility of converting Russian icebreaker reactors from HEU to LEU fuel, Science and Global Security, vol. 14, pp. 33-48, 2006, Routledge Taylor & Francis Group.

European Search Report in related application No. EP 10 16 6457 mailed Aug. 11, 2010.

(56) References Cited

OTHER PUBLICATIONS

Halber D., et al., Energy Futures, MIT energy Initiative, 2009, ISSN 1942-4671, Massachusetts Institute of Technology., pp. 5-7.

J. Buongiorno et al., Core Design Options for High Power Density BWRs (MIT-NFC-PR-089), Nuclear Fuel Cycle (NFC) Technology and Policy Program, Dec. 2006.

J. Buongiorno et al., Core Design Options for High Power Density BWRs (MIT-NFC-PR-097), Nuclear Fuel Cycle (NFC) Technology and Policy Program, Nov. 2007.

J. Buongiorno et al., Core Design Options for High Power Density BWRs (CANES-NFC-PR-102), Nuclear Fuel Cycle (NFC) Technology and Policy Program, Sep. 2008.

D. Carpenter et al., High Performance Fuel Design for Next Generation PWRs: Final Report (MIT-NFC-PR-082), Nuclear Fuel Cycle (NFC) Technology and Policy Program, Jan. 2006.

International Preliminary Report on Patentability regarding PCT/US2011/036034, mailed Aug. 8, 2012.

International Preliminary Report on Patentability dated Aug. 25, 2013 of PCT/US2012/020878 filed Jan. 11, 2012 (10 pages).

* cited by examiner

NUCLEAR REACTOR (ALTERNATIVES), FUEL ASSEMBLY OF SEED-BLANKET SUBASSEMBLIES FOR NUCLEAR REACTOR (ALTERNATIVES), AND FUEL ELEMENT FOR FUEL ASSEMBLY

CROSS-REFERENCE TO RELATED APPLICATIONS

This application is a continuation-in-part of U.S. patent application Ser. No. 12/340,833, filed Dec. 22, 2008, now U.S. Pat. No. 8,116,423, and a continuation-in-part of PCT/RU2008/000801 (WO/2010/074592), filed Dec. 25, 2008. This application also claims the benefit of priority under the Paris Convention to PCT/RU2007/000732, filed Dec. 26, 2007. This application further claims the benefit of priority from U.S. provisional patent application Ser. No. 61/116,730, filed Nov. 21, 2008. This application further claims the benefit of priority from U.S. provisional patent application Ser. No. 61/432,741, filed Jan. 14, 2011, titled "NUCLEAR REACTOR (ALTERNATIVES), FUEL ASSEMBLY OF SEED-BLANKET SUBASSEMBLIES FOR NUCLEAR REACTOR (ALTERNATIVES), AND FUEL ELEMENT FOR FUEL ASSEMBLY." This application further claims the benefit of priority from U.S. provisional patent application Ser. No. 61/333,467, filed May 11, 2010, titled "METAL FUEL ASSEMBLY." This application further claims the benefit of priority from U.S. provisional patent application Ser. No. 61/393,499, filed Oct. 15, 2010, titled "METAL FUEL ASSEMBLY." This application further claims the benefit of priority from U.S. provisional patent application Ser. No. 61/444,990, filed Feb. 21, 2011, titled "METAL FUEL ASSEMBLY." The entire content of all of these priority applications are incorporated herein by reference.

TECHNICAL FIELD

The invention relates in general to light water reactor designs in which thorium is used as fuel and in particular to designs of jacketless fuel assemblies, which make up the cores of pressurized water reactors (PWRs) such as the VVER-1000 and AP-1000.

BACKGROUND

Nuclear power remains an important energy resource throughout the world. Many countries that lack adequate indigenous fossil fuel resources rely primarily on nuclear power to produce electricity. In many other countries, nuclear power is used as a competitive source of electricity which also increases the diversity of the types of energy used. In addition, nuclear power also makes a very important contribution to the achievement of such goals as controlling fossil fuel pollution (such as acid rain and global warming) and conserving fossil fuel for future generations.

Although safety is certainly a major issue in the design and operation of nuclear reactors, another key issue is the danger of the proliferation of materials that could be used in nuclear weapons. This danger is especially relevant to countries with unstable governments, whose possession of nuclear arms could pose a significant threat to world security. Nuclear power therefore should be generated and used in a way that does not lead to the proliferation of nuclear weapons and the resulting risk of their use.

All current nuclear reactors create large amounts of material customarily referred to as reactor-grade plutonium. A typical 1000 MW reactor, for example, creates about 200-300 kg per year of reactor-grade plutonium, which can be suitable for producing nuclear weapons. Hence the fuel discharged from the cores of conventional reactors is highly proliferative material, and security measures are required to prevent the discharged fuel from falling into the hands of unauthorized individuals. There is a similar security problem with the enormous stockpiles of weapons-grade plutonium created in the U.S. and the countries of the former Soviet Union in the process of dismantling of nuclear weapons.

There are other problems in the operation of conventional nuclear reactors associated with the constant need to dispose of long-life radioactive waste and the rapid depletion of worldwide supply of natural uranium raw material.

To solve these problems, there have been recent attempts to develop nuclear reactors that use low enriched uranium (low enriched uranium has a U-235 content of greater than 0.7% and less than or equal to 20%) and do not generate significant amounts of proliferative materials such as plutonium. Examples of such reactors have been disclosed in international applications WO 85/01826 and WO 93/16477, which disclose seed-blanket reactors that obtain a substantial percentage of their power from blanket zones with thorium fuel. The blanket zones surround a seed zone containing fuel rods of low enriched uranium. The uranium in the seed fuel rods releases neutrons which can be captured by the thorium in the blanket zones, thus creating fissile U-233, which fissions and releases heat for the reactor power plant.

The use of thorium as nuclear reactor fuel is attractive because worldwide thorium reserves are considerably larger than uranium reserves. In addition, both of the aforementioned reactors are proliferation resistant in the sense that neither the initial fuel loaded nor the fuel discharged at the end of each fuel cycle is suitable for producing nuclear weapons. This result is achieved by using only enriched uranium as seed fuel, selecting moderator/fuel volume ratios to minimize plutonium production, and adding a small amount of enriched uranium to the blanket zone, where the U-238 component is homogeneously distributed with the residual U-233 at the end of the blanket cycle and "denatures" (changes the natural properties of) the U-233, as a result of which it becomes unsuitable for making nuclear weapons.

Unfortunately, neither of the aforementioned reactor designs is truly "nonproliferative." In particular, it has been discovered that both of the designs result in a level of production of proliferative plutonium in the seed zone which is higher than the minimum possible level.

In addition, neither of the previous reactor designs has been optimized from the standpoint of operational parameters. For example, moderator/fuel volume ratios in the seed zone and blanket zones are particularly critical for minimizing the amount of plutonium generated in the seed zone, so that adequate heat is released by the seed fuel rods, and optimum conversion of thorium to U-233 in the blanket zone is ensured. Research shows that the preferred moderator/fuel ratios indicated in the international applications are too high in the seed zones and too low in the blanket zones.

The previous reactor core designs also are not especially efficient in consuming enriched uranium in the seed fuel elements. As a result, the fuel rods discharged at the end of each seed fuel cycle contained so much residual uranium that it may prove economically viable to reprocess them for reuse in another reactor core.

The reactor disclosed in application WO 93/16477 also requires a complex mechanical reactor control system which makes it unsuitable for refitting a conventional reactor core. Similarly, the reactor core disclosed in application WO 85/01826 cannot easily be transferred into a conventional core, because its design parameters are not compatible with the conventional core parameters.

Finally, both of the previous reactor designs were designed specifically to burn enriched uranium with thorium and are not optimized for consuming large amounts of plutonium. Hence neither design provides a solution to the problem of stockpiled plutonium.

A reactor with a core which includes a set of seed-blanket assemblies, each of which contains a central seed region which includes seed fuel elements made of a material capable of nuclear fission containing uranium-235 and uranium-238, an annular blanket that surrounds the seed region and includes blanket fuel elements containing primarily thorium and 10% by volume or less enriched uranium, a moderator in the seed region, with a volume ratio of moderator to fuel in the range of 2.5 to 5.0, and a moderator in the blanket region, with a ratio of moderator to fuel in the range of 1.5 to 2.0, is known according to patent RU 2176826. Each of the seed fuel elements is made of uranium-zirconium alloy, and the seed zone makes up 25-40% of the total volume of each seed-blanket module.

The known reactor provides optimum operation from the standpoint of economy and has enhanced proliferation resistance compared to conventional commercial nuclear reactors. This reactor can be used to consume large amounts of plutonium while reducing the amount of used fuel generated at the end of the fuel cycle. The reactor produces substantially smaller amounts of transuranic elements which require long-term waste storage sites.

However, the seed-blanket assemblies used in the reactor are not suitable for use in existing light water reactors such as the VVER-1000.

A fuel assembly for a light water reactor similar to the reactor described above, which, specifically, has a hexagonal cross-sectional form, which makes it possible to install the fuel assembly from the seed-blanket modules in a conventional light water reactor, is known from the description for patent RU 2222837.

Other than the presentation of the cross-sectional form of the assembly, however, the description for the aforementioned patent contains no information on the configuration of the assembly which would allow installing it in an existing light water reactor such as the VVER-1000 without modifying the reactor design.

A fuel assembly for a light water reactor including a bundle of fuel elements and guide channels in spacer grids, a tailpiece and a head, wherein the spacer grids are connected to each other and to the tailpiece by elements arranged along the length of the fuel assembly, and the head is made up of upper and lower tie plates, cladding situated between the plates, and a spring unit, and wherein outer ribs on the head shell are connected to each other along projections of the rim and along the lower parts by perforated plates, is known according to patent RU 2294570.

The known fuel assembly is classified as a design for jacketless fuel assemblies, which make up the cores of light water reactors (LWRs), including PWR reactors such as the VVER-1000 and AP-1000, and has enhanced operating properties due to increased rigidity, reduced head length and increased free space between the fuel rod bundle and the head, with a simultaneous increase in the length of the fuel rods. This design makes it possible to increase the fuel load in the fuel assembly with greater depletion depth and thereby to increase the reactor core power and the life cycle of the fuel assembly.

One object of one or more embodiments of the invention is the creation of a fuel assembly which, on the one hand, generates a substantial percentage of its power in a thorium-fueled blanket region and enhances the proliferation resistance of used fuel and, on the other hand, can be installed in an existing light water reactor such as the VVER-1000 and AP-1000 without requiring substantial modifications.

SUMMARY OF EMBODIMENTS OF THE INVENTION

This object and/or other objects, according to one of the embodiments of the invention, are achieved by a fuel assembly for an LWR having in plan the form of a regular hexagon contains a seed subassembly, a blanket subassembly surrounding it, a head, a tailpiece and a frame structure, wherein the seed subassembly contains a bundle of fuel elements, each of which has a kernel comprised of enriched uranium or reactor-grade plutonium, with the said kernel being enclosed by a cladding made of zirconium alloy and having a three-lobed profile forming spiral spacer ribs; the tailpiece of the seed subassembly with a support grid attached to it to hold the fuel elements of the seed subassembly; a channel connected to the tailpiece of the seed subassembly having in plan the form of a regular hexagon, with channel placed around the fuel rod bundle; a guide grid attached to the upper part of the channel for placing fuel elements so as to allow their free axial movement; a central tube forming a guide channel to accommodate controls, and peripheral tubes attached to the support grid, which form guide channels for inserting absorber rods and control rods, and placed in the head with the capability of elastic axial displacement; the blanket subassembly includes a frame structure comprised of six lengthwise angle units with spacer grids attached to them, with an opening in the central area to accommodate the channel of the seed subassembly; a bundle of fuel elements comprised of thorium (e.g., thorium dioxide) with an addition of enriched uranium (e.g., uranium dioxide) situated in the frame structure; and the tailpiece of the blanket subassembly, to which fuel elements of the blanket subassembly are attached, and which can be coupled with the support tube of the light water reactor, with the said tailpiece of the blanket subassembly and the tailpiece of the seed subassembly being attached by a locking mechanism and forming the tailpiece of the fuel assembly.

The head can be equipped with a pressure element that is in contact with the channel of the seed subassembly.

In another embodiment of the invention, a fuel assembly having in plan the form of a regular hexagon contains a seed subassembly, a blanket subassembly surrounding it, a head, a tailpiece that can be coupled with the support tube of the light water reactor and a frame structure, wherein the seed subassembly contains a bundle of fuel elements, each of which has a kernel comprised of enriched uranium or reactor-grade plutonium, with the said kernel being enclosed by a cladding made of zirconium alloy and having a three-lobed profile forming spiral spacer ribs; the tailpiece of the seed subassembly with a support grid attached to it to hold the fuel elements of the seed subassembly; a channel connected to the tailpiece of the seed subassembly having in plan the form of a regular hexagon, with the channel placed around the fuel rod bundle; a guide grid attached to the upper part of the channel for placing fuel elements so as to allow their free axial movement; a central tube forming a guide channel to accommodate controls, and peripheral tubes, which form guide channels for inserting absorber rods and control rods, and placed in the head with the capability of elastic axial displacement; the blanket subassembly includes a frame structure comprised of six lengthwise angle units with spacer grids attached to them, with an opening in the central area to accommodate the channel of the seed subassembly; a bundle of fuel elements comprised of thorium with an addition of enriched uranium situated in the frame structure and attached to the bottom tie plate (the tailpiece); and several support tubes attached to the tailpiece, with the head equipped to allow elastic axial displacement of the support tubes.

Displacer of zirconium or zirconium alloy having the cross-sectional form of a regular triangle is situated primarily along the longitudinal axis of the kernel in at least one of the embodiments of the invention to promote more uniform temperature distribution in the kernel volume.

The axial coiling pitch of the spiral spacer ribs also ranges from 5% to 20% of the fuel rod length in at least one of the embodiments of the invention.

In addition, the fuel rods of the seed subassembly in at least one embodiment of the invention have a circumferential orientation such that the three-lobed profiles of any two adjacent fuel rods have a common plane of symmetry which passes through the axes of the two adjacent fuel elements in at least one cross section of the fuel rod bundle.

Also in at least one of the embodiments of the invention, the kernel preferably is comprised of U—Zr alloy with up to 30% by volume uranium, with up to 20% enrichment with the U-235 isotope, and the kernel is comprised of Pu—Zr alloy with up to 30% by volume plutonium (e.g., reactor-grade or weapons-grade plutonium).

In addition, an object of one or more embodiments of the invention is a light water reactor containing a set of fuel assemblies, at least one of which is construction according to one of the alternative configurations described above. Either some or all of the fuel assemblies placed in the reactor may conform to the alternatives described above.

One or more embodiments of the present invention provide a fuel element for use in a fuel assembly of a nuclear reactor. The fuel element includes a kernel comprising fissionable material. The fuel element has a multi-lobed profile that forms spiral ribs. There may be three or more ribs (e.g., 4 ribs). The fuel element may include a cladding enclosing the kernel, and the cladding may include a zirconium alloy. The fuel element may include a displacer with a cross sectional shape in the form of a regular triangle or another shape (e.g., square), the displacer extending along a longitudinal axis of the kernel. The displacer may comprise zirconium or a zirconium alloy.

One or more embodiments of the present invention provide a fuel element for use in a fuel assembly of a nuclear reactor. The fuel element includes a central displacer extending along a longitudinal axis of the fuel element. The displacer includes projections that extend laterally outward. The fuel element also includes a kernel extending laterally outward from the displacer. The kernel includes fissionable material and includes a plurality of ribs that extend laterally outward. The projections are aligned with respective ribs. The projections and their respective ribs may have matching twists along their longitudinal axes. In a cross-section of the fuel element that is perpendicular to the longitudinal axis, the kernel may surround the displacer. The plurality of ribs may include circumferentially equally-spaced ribs, wherein a cross sectional shape of the displacer has the form of a regular polygon having a corner for each of said ribs. For example, the plurality of ribs may include three circumferentially equally-spaced ribs, wherein a cross sectional shape of the displacer has the form of a regular triangle. The apexes of the regular triangle may be aligned with the lobes of the kernel.

One or more embodiments of the present invention provide a fuel assembly for use in a nuclear reactor. The fuel assembly includes a seed subassembly comprising a seed frame and a plurality of seed fuel elements supported by the seed frame. The fuel assembly also includes a blanket subassembly comprising a blanket frame and a plurality of blanket fuel elements supported by the blanket frame. The fuel assembly further includes a locking mechanism that locks the seed and blanket frames together. The seed assembly is detachable from the blanket subassembly when the locking mechanism is released. The blanket subassembly may laterally surround the seed subassembly. The blanket subassembly may include a central opening into which the seed subassembly fits. The plurality of seed fuel elements may include fissionable material, and the plurality of blanket fuel elements may comprise thorium.

One or more embodiments of the present invention provide a method of using a fuel assembly according to one or more of the above embodiments. The seed and blanket subassemblies are attached to each other. The method includes, sequentially:
  (a) placing the fuel assembly in a core of a nuclear reactor;
  (b) burning at least some of the fissionable material in the core of the nuclear reactor;
  (c) detaching the seed subassembly from the blanket subassembly; and
  (d) attaching a new seed subassembly to the blanket subassembly, the new seed subassembly comprising additional fissionable material.

The method may also include:
  (e) burning at least some of the additional fissionable material in the core of the nuclear reactor.

According to an embodiment, a fuel element for use in a fuel assembly of a nuclear reactor comprises a kernel having a multi-lobed profile that forms spiral ribs that comprise fissionable material. The fuel element also includes a central metal displacer extending along a longitudinal axis of the kernel, and a metal cladding enclosing the kernel. The fuel element is fabricated by joint extrusion of the displacer, kernel, and cladding through a die. In addition, the spiral ribs have a pitch of axial twist of between 5% and 20% of a length of the fuel element.

According to another embodiment, a fuel assembly for use in a nuclear reactor includes a frame configured to be removably disposed in a nuclear reactor, and a plurality of fuel elements supported by the frame. At least some of the plurality of fuel elements each comprise a kernel having a multi-lobed profile that forms spiral ribs that comprise fissionable material, a central metal displacer extending along a longitudinal axis of the kernel, and a metal cladding enclosing the kernel. At least some of the plurality of fuel elements are each fabricated by joint extrusion of the displacer, kernel, and cladding through a die.

According to another embodiment, a method of manufacturing a fuel element for use in a nuclear reactor includes joint extruding a kernel, a central metal displacer, and a cladding through a die to form the fuel element. In the method, after the extruding, the kernel has a multi-lobed profile that forms spiral ribs that comprise fissionable material. Additionally after the extruding, the displacer extends along a longitudinal axis of the kernel, and the metal cladding encloses the kernel. Furthermore, after the extruding, the spiral ribs have a pitch of axial twist of between 5% and 20% of a length of the fuel element.

Additional and/or alternative objects, features, aspects, and advantages of one or more embodiments of the present invention will become apparent from the following description, the accompanying drawings, and the appended claims.

BRIEF DESCRIPTION OF THE DRAWINGS

The features and advantages of various embodiments of this invention will be apparent from the following detailed description of the preferred embodiments thereof together with the attached drawings, in which.

DETAILED DESCRIPTION OF EXEMPLARY EMBODIMENTS

Figure 1:
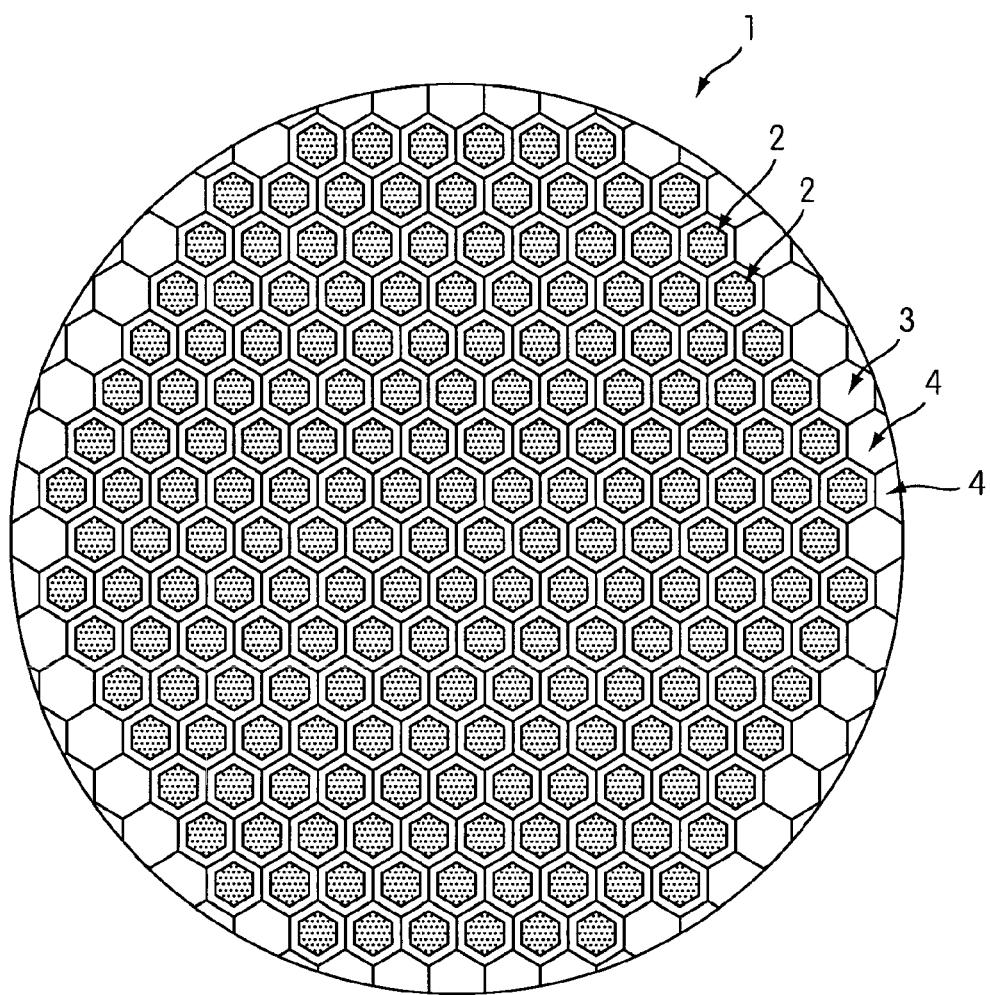
FIG. 1 is a schematic cross-sectional illustration of a nuclear reactor core containing fuel assembles constructed according to an embodiment of this invention.

FIG. 1 shows the a nuclear reactor core 1 containing a set of fuel assemblies 2 which include a seed region and a blanket region, which form a hexagonal configuration, wherein the fuel assemblies themselves have in plan the form of a regular hexagon. The core 1 has the same geometric configuration and dimensions as the core in a conventional VVER-1000 light water reactor, so that the reactor can be refitted with such assemblies to form a core of 163 fuel assemblies 2. The difference between the core 1 and the core of the VVER-1000 reactor lies in the composition and structure of the fuel assemblies 2, as will be disclosed in greater detail below. The core 1 and fuel assemblies 2 presented here have been developed for use in a conventional VVER-1000 light water reactor; however, a similar core and fuel assemblies can be created for use in other standard or specially designed reactors without going beyond the scope of this invention.

The core 1 is surrounded by a reflector 3, which preferably is comprised of a set of reflector assemblies 4. Each reflector assembly 4 preferably contains a mixture of water and metal of the core basket/high-pressure vessel. In addition, easy reflector assembly 4 may be comprised primarily of thorium oxide.

Figure 2:
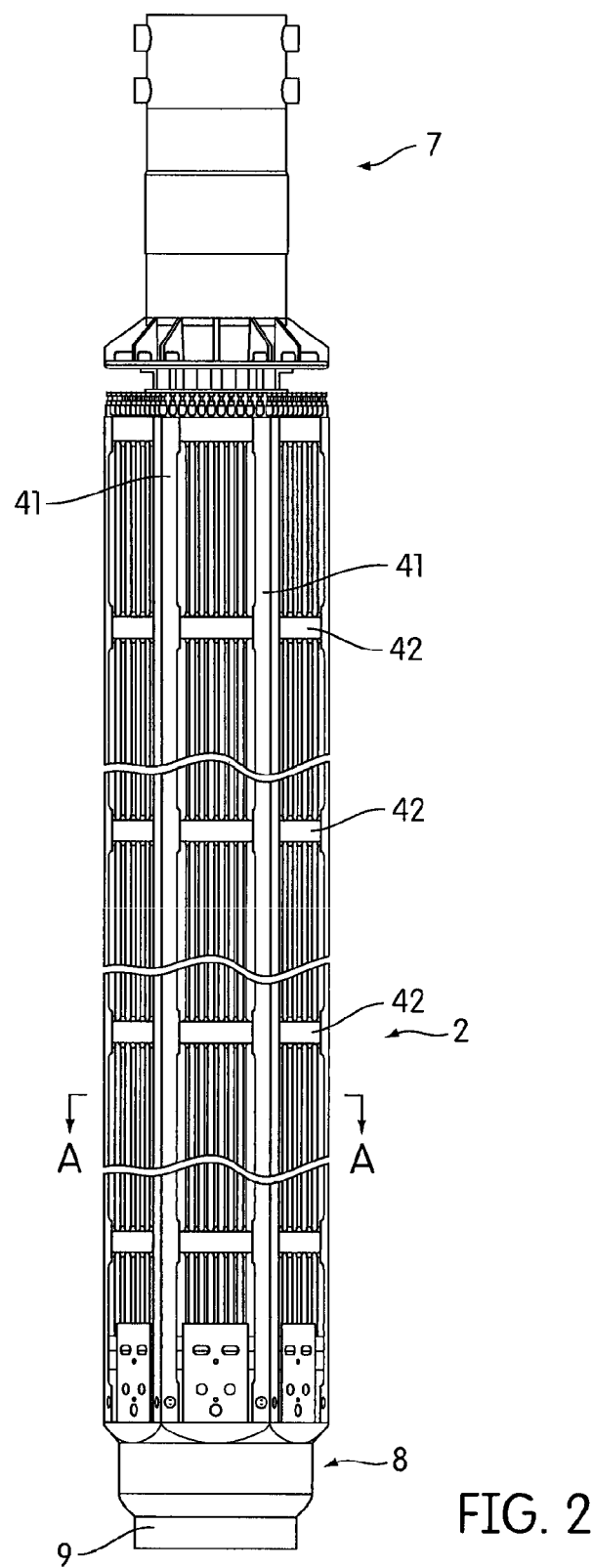
FIG. 2 is a general side view of a fuel assembly according to the first embodiment of the invention, including cutaway views.

FIG. 2 shows a general view of the first alternative configuration for each of the fuel assemblies 2.

Figure 5:
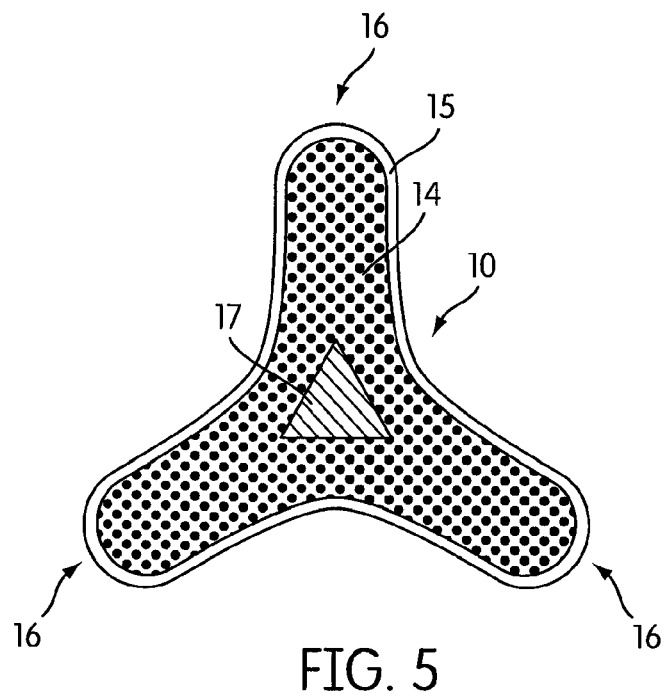
FIG. 5 is a cross-sectional view of a seed fuel rod.
Figure 6:
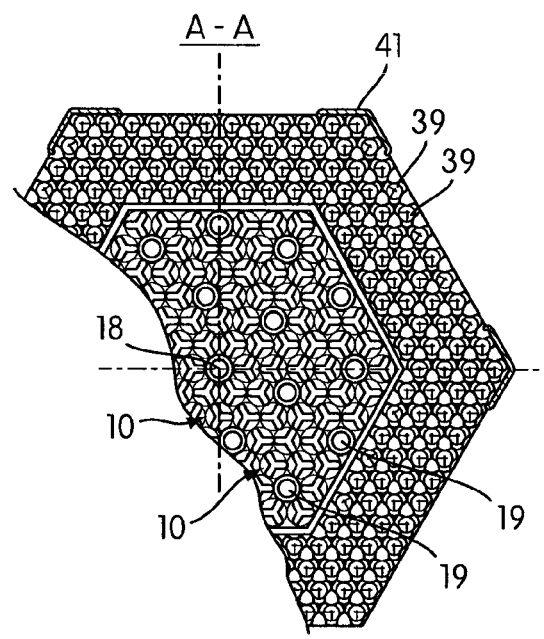
FIG. 6 is the A-A cross-sectional view of the fuel assembly as per FIG. 2.

A fuel assembly 2 contains a seed subassembly 5, a blanket subassembly 6 surrounding it, a head 7, and a tailpiece 8 with its supporting part 9 in contact with the support tube of the reactor (not shown). The fuel assembly has in plan the form of a regular hexagon. The seed subassembly 5 contains a fuel rod bundle 10 which includes a number of rods, such as 108, placed on a support grid 11, which is attached to the tailpiece of the seed subassembly 5. A channel 12 with a hexagonal cross section is connected to the tailpiece of the seed subassembly 5 and encloses the fuel rod bundle 10. A guide grid 13 for placing fuel elements 10 so as to allow their free axial movement is attached to the upper part of the channel 12. Each of the seed fuel elements has a kernel 14, which includes enriched uranium or reactor-grade plutonium. The kernel is comprised primarily of U—Zr alloy, with a uranium concentration of 30% or less by volume in the fuel composition and 19.7% or less uranium-235 enrichment. The kernel 14 is enclosed by cladding 15 of zirconium alloy and has a three-lobed profile forming spiral spacer ribs 16 (FIG. 5).

A displacer 17 of zirconium or zirconium alloy (i.e., an alloy that comprises zirconium) with the cross-sectional form of a regular triangle is placed along the longitudinal axis of the kernel. The seed fuel rods 10 may be fabricated as a single assembly unit by joint pressing (extrusion through a die). The axial coiling pitch of the spiral spacer ribs 16 is selected according to the condition of placing the axes of adjacent fuel rods 10 with a spacing equal to the width across corners in the cross section of a fuel rod and is 5% to 20% of the fuel rod length. Stability of the vertical arrangement of the fuel rods 10 is provided: at the bottom—by the support grid 11; at the top—by the guide grid 13; relative to the height of the core—by a system of bands (not shown) spaced evenly in the channel relative to the height of the bundle. The seed fuel elements 10 have a circumferential orientation such that the three-lobed profiles of any two adjacent fuel rods have a common plane of symmetry which passes through the axes of the two adjacent fuel elements (FIG. 5) in at least one cross section of the fuel rod bundle.

In addition, the seed subassembly contains a central tube 18 that forms a guide channel to accommodate controls, and peripheral tubes 19 attached to the support grid 13 which form guide channels for inserting control absorber elements based on boron carbide ($B_4C$) and dysprosium titanate ($Dy_2TiO_5$) (not shown) and burnable absorber rods based on boron carbide and gadolinium oxide ($Gd_2O_3$) (not shown) and are placed in the head 7 with the capability of elastic axial displacement. The peripheral tubes 19 that form the guide channels are made of zirconium alloy.

The head 7 (FIG. 3) is comprised of a spring unit, which includes compressible springs 20, an upper plate 21, cladding 22 and a lower plate 23. The cladding 22 is comprised of two telescoped parts: the upper part 24 rigidly connected to the upper plate 21, and the lower part 25 rigidly connected to the lower plate 23. The spring unit including the springs 20 is placed inside the cladding 22. The peripheral tubes 19 fit into sleeves 26 and are capable of acting on the bottom ends of the sleeves (due to the presence of a step on the outer surface of the tube 19, for example). The sleeves 26 have flanges against which the compression springs of the spring unit 20 rest. The other ends of the springs 20 rest against the upper plate 21. The upper ends of the tubes 19 pass freely through openings in the upper plate 21, and the sleeves 26 pass through openings in the lower plate 23. The tubes 19 have stops 27 at the top ends. The central tube 18 is installed in a manner similar to the peripheral tubes 19, except that it passes freely through the lower plate without the use of a sleeve. The spring 20 through which the central tube 18 passes rests directly against the lower plate 23 of the head 7. A stay 28 with a stop 29 at the upper end is attached to the lower plate 23 to limit the distance between the plates 21 and 23; the stay 28 passes freely through an opening in the upper plate 21. A pressure element 30 in contact with the channel 12 of the seed subassembly 5 is attached to the lower plate 23. Hence a load applied to the upper plate 21 with the channel 12 fixed against axial movement is transmitted to the support grid 11 both by way of the peripheral tubes 19 and directly through the channel 12.

The head may be constructed without the sleeves 26. In that case, all the springs 20 of the spring unit rest against the lower plate 23, and the peripheral tubes 19 pass freely through matching openings in the lower plate 23 (similar to the central tube 18). The entire load applied to the upper plate 21 with the channel 12 fixed against movement is transmitted to the support grid 11 directly through the channel 12.

The tailpiece of the seed subassembly 5 has a locking device 31 attached to the casing which includes a cylindrical wall 32 with openings 33, balls 34 placed in the openings, and a locking element 35 with an annular slot 36 capable of axial movement. The locking device 31, which provides connection of the seed subassembly 5 with the tailpiece 37 of the blanket subassembly, can be also be constructed in any other form; it is important only that it provide a detachable connection of the tailpieces of the seed and blanket subassemblies.

The blank subassembly 6 includes a frame structure 38, a bundle of fuel rods 39 situated in the frame, and a tailpiece 40.

The frame structure 38 is comprised of six lengthwise angle units 41 with spacer grids 42 attached to them by resistance spot welding. Each spacer grid 42 is a honeycomb grid forming a set of cells (specifically 228) attached to the rim in outer and inner hexagons. The spacer grid 42 provides the required spacing of the fuel rods 39 and the required length of contact with them to allow the fuel rods 39 to slide in the spacer grid cells when they expand in length due to radiation and heat, the minimum possible sliding forces for the fuel rods to reduce internal stresses in the bundle, and the required initial tightness to avoid fretting corrosion of the fuel elements during operation. The spacer grids 42 have an opening in the central area to accommodate the channel 12 of the seed subassembly 5.

The angle units are rigidly connected in the lower part to the tailpiece 40 of the blanket subassembly 6, to which the support grid 43 of the blanket subassembly to hold the fuel rods 39 is attached. The support grid 43 of the blanket subassembly 6 provides mechanical strength under loads in modes with normal operating conditions, modes with violations of normal operating conditions, and design accidents and also provides the hydraulic resistances required according to calculations.

According to one embodiment, the fuel rod bundle 39 of the blanket subassembly includes a set of fuel elements (specifically 228 elements) made of a composition including 12% by volume $UO_2$ with 19.7% U-235 enrichment and 88% by volume $ThO_2$.

The ratio of the volume of all fuel elements of the seed subassembly $V_{seed}$ to the volume of all fuel elements of the blanket subassembly $V_{blank}$ is approximately 0.72.

The tailpiece 40 of the blanket subassembly 6 includes a support grid 43, a casing 44 and a ring 46 rigidly connected to it by braces 45; the ring interacts with the locking device 31. The ends of the blanket fuel elements 39 are attached to the support grid 43. The support grid 43 provides mechanical strength under loads modes with normal operating conditions, modes with violations of normal operating conditions, and design accidents and also provides the required hydraulic resistance to the flow of coolant (water). The casing 44 can be coupled with the support tube (not shown) of the light water reactor and acts as a guide device for delivering coolant to the areas of the seed and blanket subassemblies.

Figure 7:
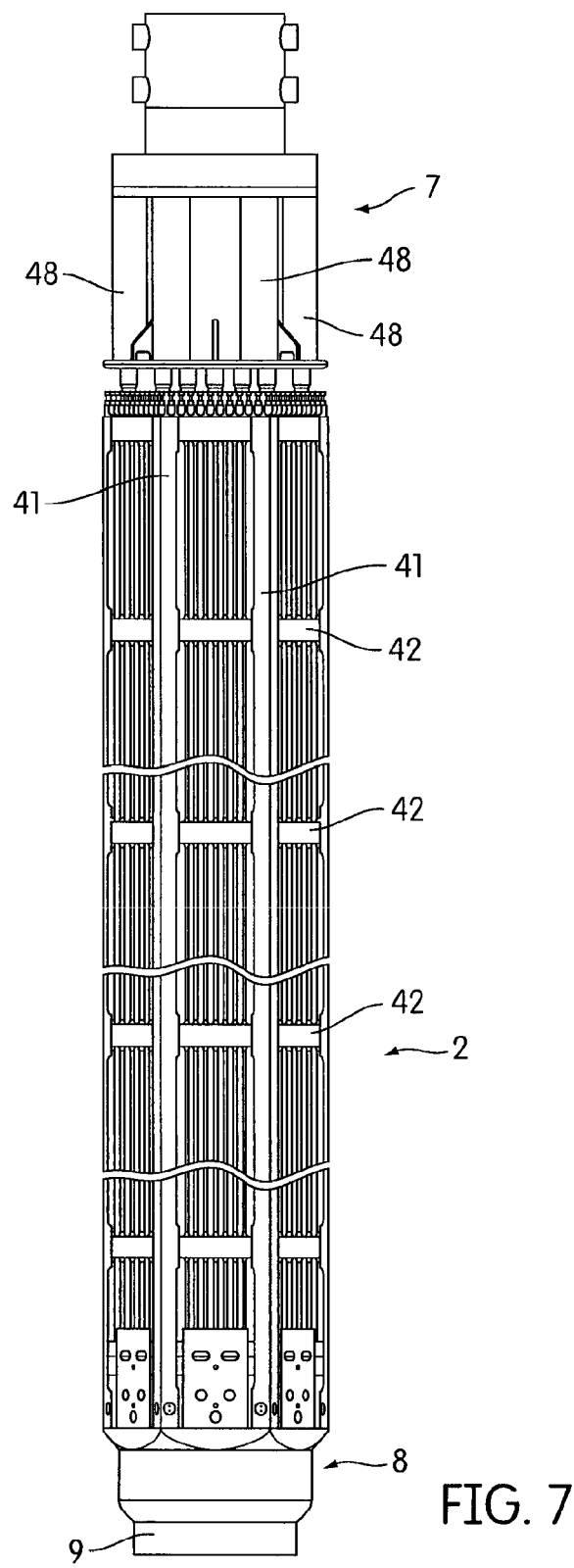
FIG. 7 is a general side view of a fuel assembly according to the second embodiment of the invention, including cutaway views.
Figure 8:
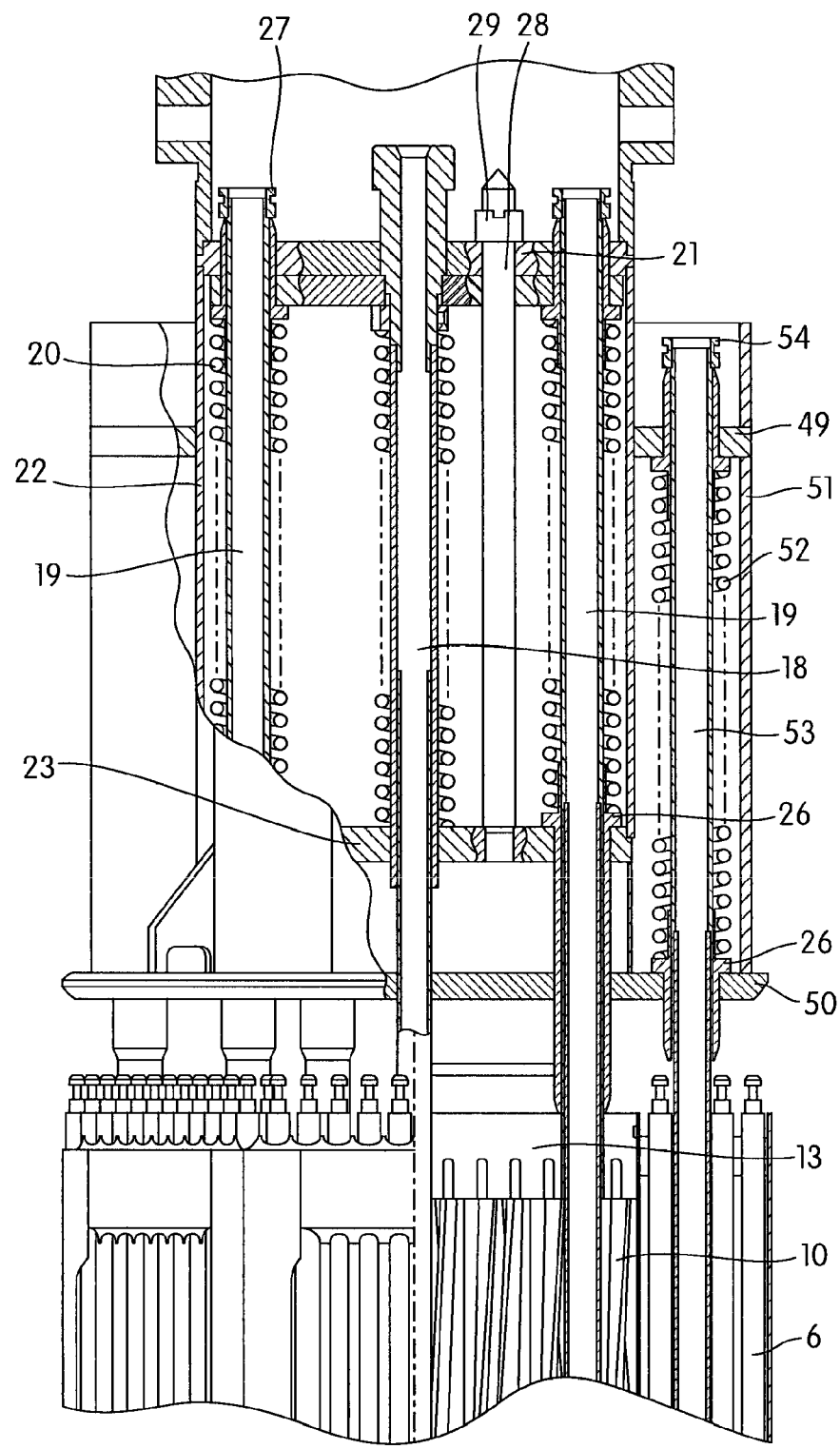
FIG. 8 is the head of the fuel assembly as per FIG. 7 in enlarged longitudinal section view.
Figure 9:
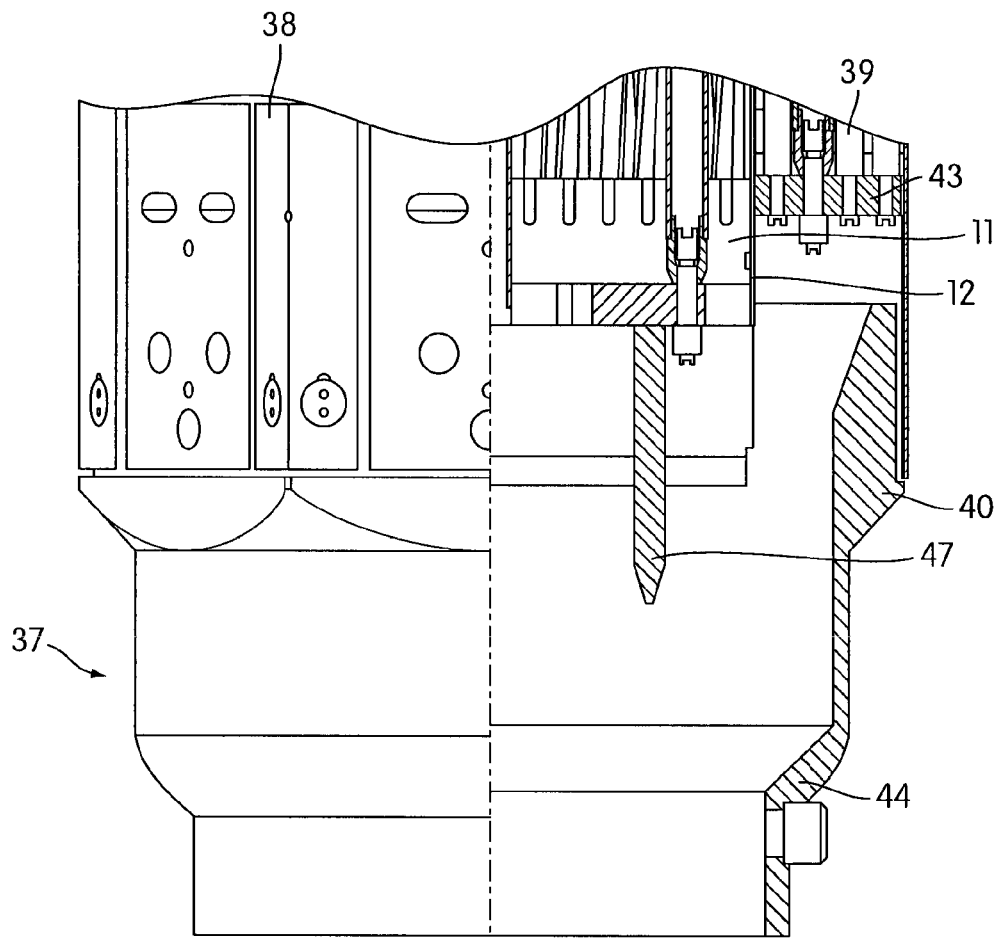
FIG. 9 is the tailpiece of the fuel assembly as per FIG. 7 in enlarged longitudinal section view.

FIGS. 7-9 show the second alternative for construction of each of the fuel assemblies 2.

Figure 3:
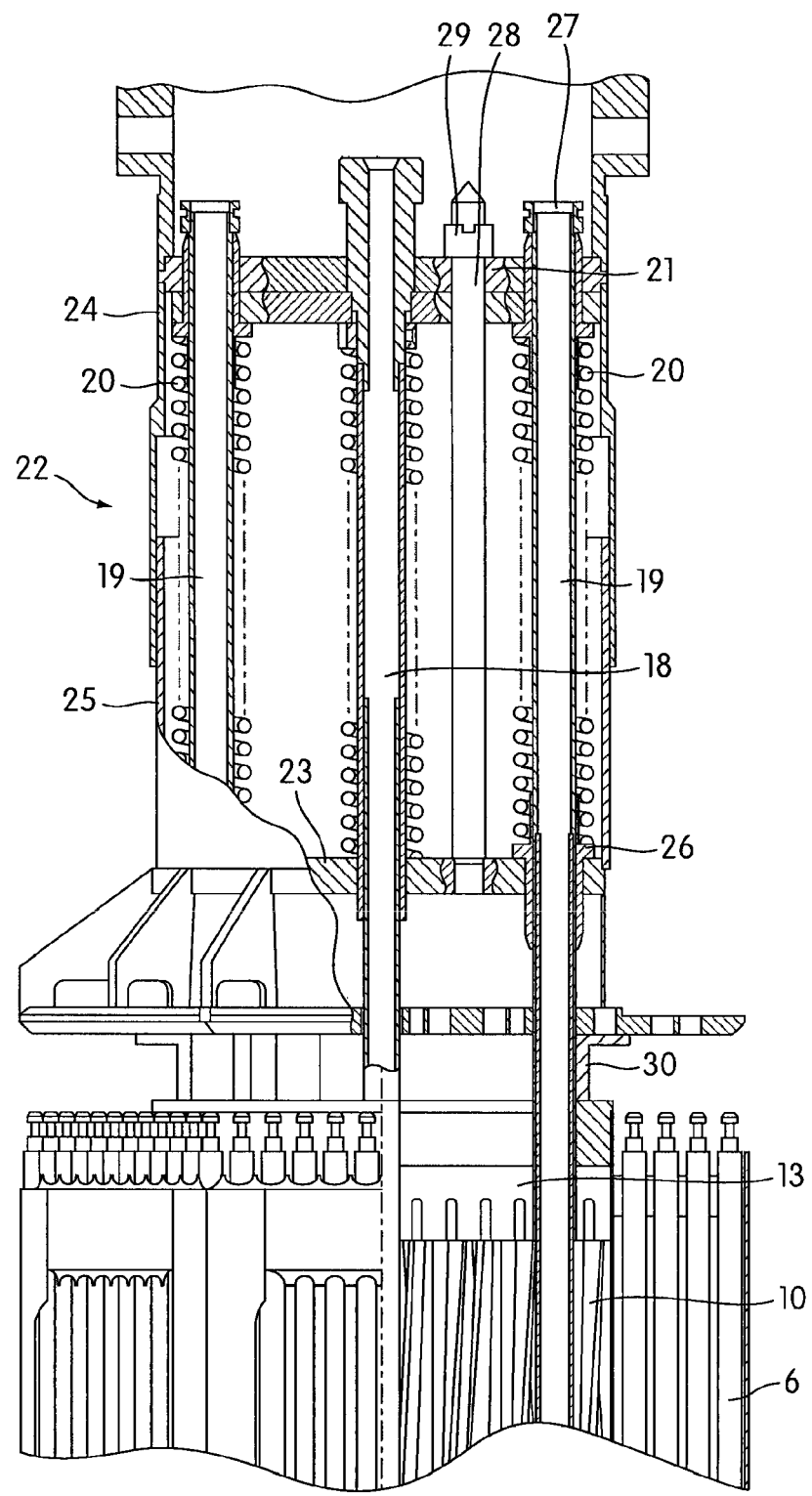
FIG. 3 is the head of the fuel assembly as per FIG. 2 in enlarged longitudinal section view.
Figure 4:
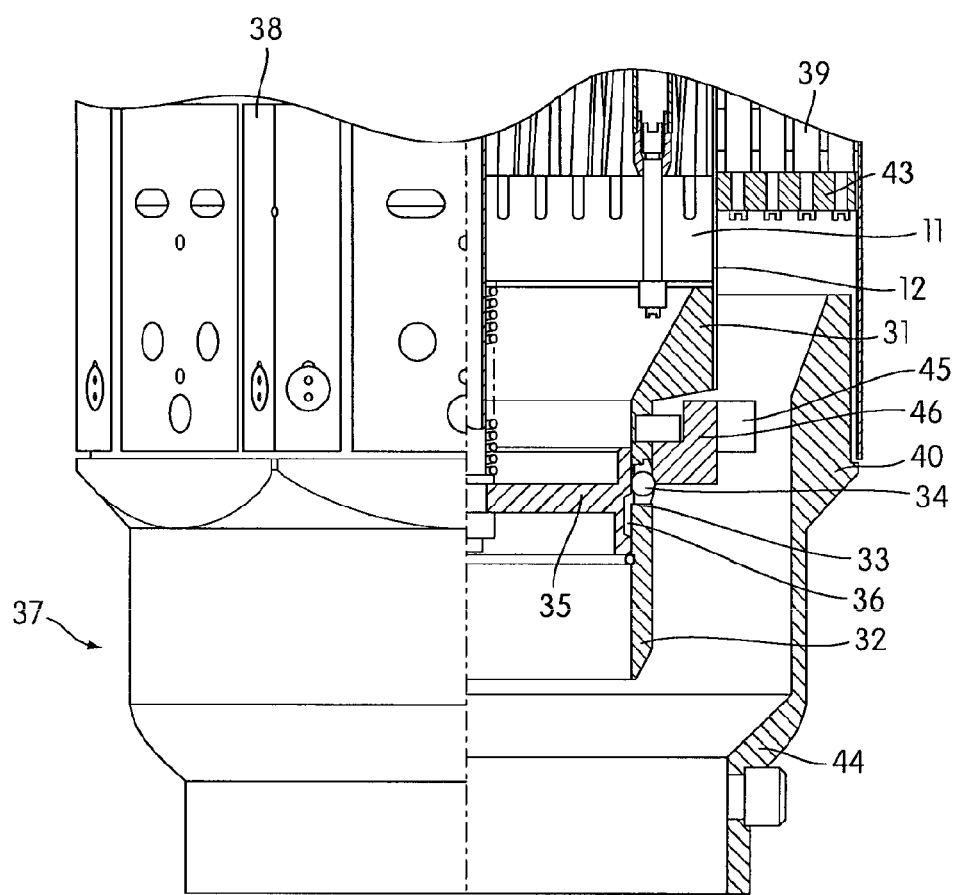
FIG. 4 is the tailpiece of the fuel assembly as per FIG. 2 in enlarged longitudinal section view.

This alternative design differs from the design shown in FIGS. 2-4 in that the seed and blanket subassemblies are not rigidly connected to each other. As shown in FIG. 9, the tailpiece of the seed subassembly has a cylindrical bottom tie plate 47 instead of the locking device 31, and the casing 44 in the tailpiece of 40 of the blanket subassembly 6 lacks braces 45 and ring 46 shown in FIG. 4. As shown in FIG. 7, the cladding 22 of the head 7 (FIG. 8), in contrast to the version shown in FIG. 3, is constructed in one piece, and an additional spring unit 48 is rigidly attached (e.g., welded) to it. The additional spring unit 48 chiefly includes several (e.g., six) additional upper plates 49 evenly distributed around the circumference and rigidly connected to the cladding 22, an additional lower plate 50 rigidly linked to the lower plate 23, cladding 51 attached to the additional plates 49 and 50, compression springs 52 and support tubes 53. The support tubes 53 are attached by the bottom ends to the support grid 43 of the blanket module 6. The upper parts of the support tubes 53 are constructed and positioned in the additional upper and lower plates 49 and 50 similar to the peripheral tubes 19; i.e., the tubes 53 fit into sleeves 26 and are capable of acting on the sleeves in an upward direction. The compression springs 52 of the additional spring unit 48 rest at one end against flanges of the sleeves 26 and at the other end against the additional upper plates 21. The upper parts of the support tubes 53 pass freely through openings in the additional upper plates 49, and the sleeves 26 pass through openings in the additional lower plate 50. The support tubes 53 have stops 54 at the top ends.

Before a fuel assembly is placed in the reactor, the seed subassembly 5 and the blanket subassembly 6 are first assembled separately.

In assembly of the seed subassembly according to the first embodiment, the fuel elements 10 are connected to the guide grid 13 attached to the channel 12, and the central tube 18 and peripheral tubes 19 are connected to the head, in addition to being attached to the guide grid 13. The tubes 18 and 19 pass through sleeves 17 situated in openings in the lower plate, through the springs 20 and through openings in the upper plate 21. Then the stops 27 are attached to the top ends of the tubes (by a threaded or bayonet joint, for example).

The fuel elements 39 of the blanket subassembly are placed in a frame structure 9 by passing them through spacer grids 42 and attaching them to the support grid 43.

Then the assembled seed and blanket subassemblies are connected to form a single fuel assembly by passing the channel 12 of the seed subassembly 5 through openings in the central part of the spacer grids 42. The configuration of these openings in the central part of the spacer grids 42 matches the cross-sectional shape of the channel 12, so that the channel 12 passes freely through the openings. The locking element 35 in the tailpiece of the seed subassembly is shifted upward, so that the balls 34 situated in openings 33 of the cylindrical wall 32 are capable of movement in an annular groove 36, thus allowing the cylindrical wall 32 to pass through the ring 46. After the tailpiece of the seed subassembly is stopped against the upper end face of the ring 46, the locking element 36 is shifted downward. The balls 34 are forced out of the groove 36, shift outward in the openings 33 and jut out of the wall 32. As a result, due to interaction of the displaced balls and the bottom end face of the ring 46, the tailpiece of the seed subassembly cannot move upward in relation to the tailpiece of the blanket subassembly. Thus the seed and blanket subassemblies form a single fuel assembly 2.

After a fuel assembly 2 is placed in the reactor 1, and the tailpiece 8 is resting in the support tube (not shown) of the light water reactor, the fuel assembly 2 is held down by the upper plate of the reactor (not shown) by resting against the face of the cladding of the upper plate 21 of the head 7. Then the force is transmitted to the spring unit with springs 20, which is compressed by an amount designed to keep the fuel assembly 2 from floating up in the flow of coolant from below; the upper plate 21 of the head 7 moves downward in relation to the lower plate 23 by the amount of compression of the spring unit. The possibility of downward movement of the upper plate 21 relative to the lower plate 23 of the head 7 is provided by telescoping of the upper part 24 of the cladding 22, which is rigidly connected to the upper plate 21, and the lower part 25 of the cladding 22, which is rigidly connected to the lower plate 23.

Then the force from the bottom ends of the springs 20 of the spring unit is transmitted through the sleeves 26, acting on the peripheral tubes 19 by their bottom ends, to the peripheral tubes 19 and then to the support grid 11 and through the tailpiece of the seed subassembly, the locking device 31, the ring 46 and the braces 45 to the tailpiece 44 of the blanket subassembly 6, which comes into contact with the support tube (not shown) of the light water reactor.

In addition, part of the compression force from the upper plate of the reactor is transmitted to the channel 12 of the seed subassembly by the action on the pressure element 30 of the force of a spring 20 enclosing the central tube 18 and resting directly against the lower plate 23, which is rigidly connected to the pressure element. If the head 7 does not have sleeves 26, the entire compression force is transmitted by way of the channel 12.

Coolant passes into the fuel assembly 2 through the casing 44 of the tailpiece of the blanket subassembly 6; the coolant flow is divided into two parts, one of which runs inside the casing 12 of the seed subassembly and bathes the seed fuel elements 10, while the other runs outside the case 12 and bathes the fuel elements 39 of the blanket subassembly.

The compression force of the head 7 acting from the upper plate of the reactor (not shown) keeps the fuel elements from floating up in the specified coolant flow.

The passage of the required (for extracting nominal power from the fuel assembly) coolant flow through the seed and blanket subassemblies at the nominal pressure gradient (used in existing VVER-1000 reactors) relative to the height of the fuel assemblies with preservation of the serviceability of the assemblies is provided:
  by the use of a channel 12 between the seed and blanket subassemblies;
  by the shape of the seed fuel elements 10 (three-lobed profile), their mutual circumferential orientation and the axial coiling pitch of the spiral spacer ribs 16, which promotes a well-developed heat-transfer surface and a significantly more even coolant temperature distribution in the cross section of the seed subassembly due to forced convective mixing of the coolant.

The complete hydraulic characteristics of the fuel assembly 2 practically coincide with the characteristics of a standard fuel assembly, which ensures maintaining the resistance of the core of a VVER-1000 reactor with fuel assemblies according to one or more embodiments of the invention at the nominal level. Hence installing fuel assemblies according to one or more embodiments of this invention in a VVER-1000 will not cause a change in the coolant flow rate in the primary loop of the reactor.

The fuel elements 10 of the seed subassembly, as they heat up during operation, begin to lengthen upward due to thermal and radiation expansion; the bundle of fuel elements expands independently of peripheral tubes 19, since the latter pass through the cells of the guide grid 13 with a guaranteed clearance. Hence the bundle of fuel elements 10 has no effect on the load-bearing peripheral tubes 19 and does not deform them; consequently, geometric stability of the form of the fuel assembly 2 is preserved during operation.

The fuel elements 39 of the blanket subassembly expand in length during operation and begin to take up the free space between their ends and the head 7 due to radiation expansion.

The operation of a fuel assembly 2 according to the second embodiment of the invention is similar, except that the casing 44 of the blanket subassembly is pressed against the support tube of the reactor by transmission of the compression force from the upper plate of the reactor through the support tubes 53, and the seed subassembly, which is not attached to the blanket subassembly, is prevented from floating up by the action of the springs 20 against the flanges of the sleeves 26, which transmit the force to the support grid 11 of the seed subassembly.

The use of one or more embodiments of this invention makes it possible to achieve a saving of natural uranium due to the presence of a thorium part (blanket subassembly) in the fuel assembly design, since the thorium during the depletion process accumulates secondary nuclear fuel in the form of uranium-233, burning of which makes a substantial contribution to the power output of a reactor core with such fuel assemblies.

The fuel assembly design according to one or more embodiments of this invention makes it possible to use the fuel assembly in VVER-1000 reactors due to mechanical, hydraulic and neutronic compatibility with the design of standard fuel assemblies.

Mechanical compatibility with the standard fuel assembly for the VVER-1000 reactor is ensured by:
  the presence of a frame structure that provides resistance to deformation during long-term operation and high fuel depletion levels;
  identical connection dimensions;
  the use of tailpiece, head and frame structure designs compatible with the corresponding parts of corner standard fuel assemblies;
  compatibility of the seed subassembly design with standard control mechanisms and load-handling devices.

The complete hydraulic characteristics of a fuel assembly according to one or more embodiments of this invention practically coincide with the characteristics of a standard fuel assembly due to the presence of a system of two parallel channels formed by the seed and blanket subassemblies and joined by common distribution (delivery) and collection headers. The seed and blanket subassemblies are hydraulically connected in the inlet and outlet segments. This fuel assembly structure ensures maintaining the resistance of the core of a VVER-1000 reactor with fuel assemblies according to one or more embodiments of the invention at the nominal level. Hence installing fuel assemblies according to one or more embodiments of this invention in a VVER-1000 reactor will not cause a change in the coolant flow rate in the primary loop of the reactor. The ratio of hydraulic resistances between the inlet to the assembly, the active part of the blanket subassembly and the outlet from the assembly in fuel assemblies according to one or more embodiments of this invention and the standard fuel assembly are similar, which ensures hydraulic compatibility of fuel assemblies according to one or more embodiments of the invention with standard assemblies and the absence of coolant overflows between them. This makes it possible to use some fuel assemblies according to one or more embodiments of this invention in a reactor at the same time with standard fuel assemblies for the reactor.

Neutronic compatibility with the standard fuel assembly is provided by the following:

the specified burn-up level is achieved by utilizing specific fuel compositions and compositions with burnable absorbers;

standard power output of the fuel assembly is achieved by utilizing specific fractions of fuel loading in seed and blanket fuel compositions;

satisfaction of requirements for an uneven profile of power output is achieved by utilizing specific fractions of fuel loading in various rows of seed rods and the composition of fuel loading in the blanket;

preservation of reactivity effects within the range typical for standard fuel assemblies is achieved by utilizing special characteristics of fuel compositions;

the ability to regulate the level of output and reduce the output using standard control systems is achieved by utilizing standard technological channels for guiding control rods in the peripheral tubes in the seed subassembly which are compatible with the subassembly.

Another advantage of one or more embodiments of the invention is that the seed-blanket fuel assembly according to one or more embodiments of this invention is sectional, which makes it possible to change the seed subassembly independently. Changing the seed subassembly more frequently produces more favorable conditions (with respect to neutron balance and irradiation time) for the thorium placed in the blanket subassembly to be converted into U-233.

According to alternative embodiments of the present invention, the blanket region and blanket fuel elements may be eliminated altogether, and the elements 10 of the seed region expanded to occupy the entire assembly.

Figure 10:
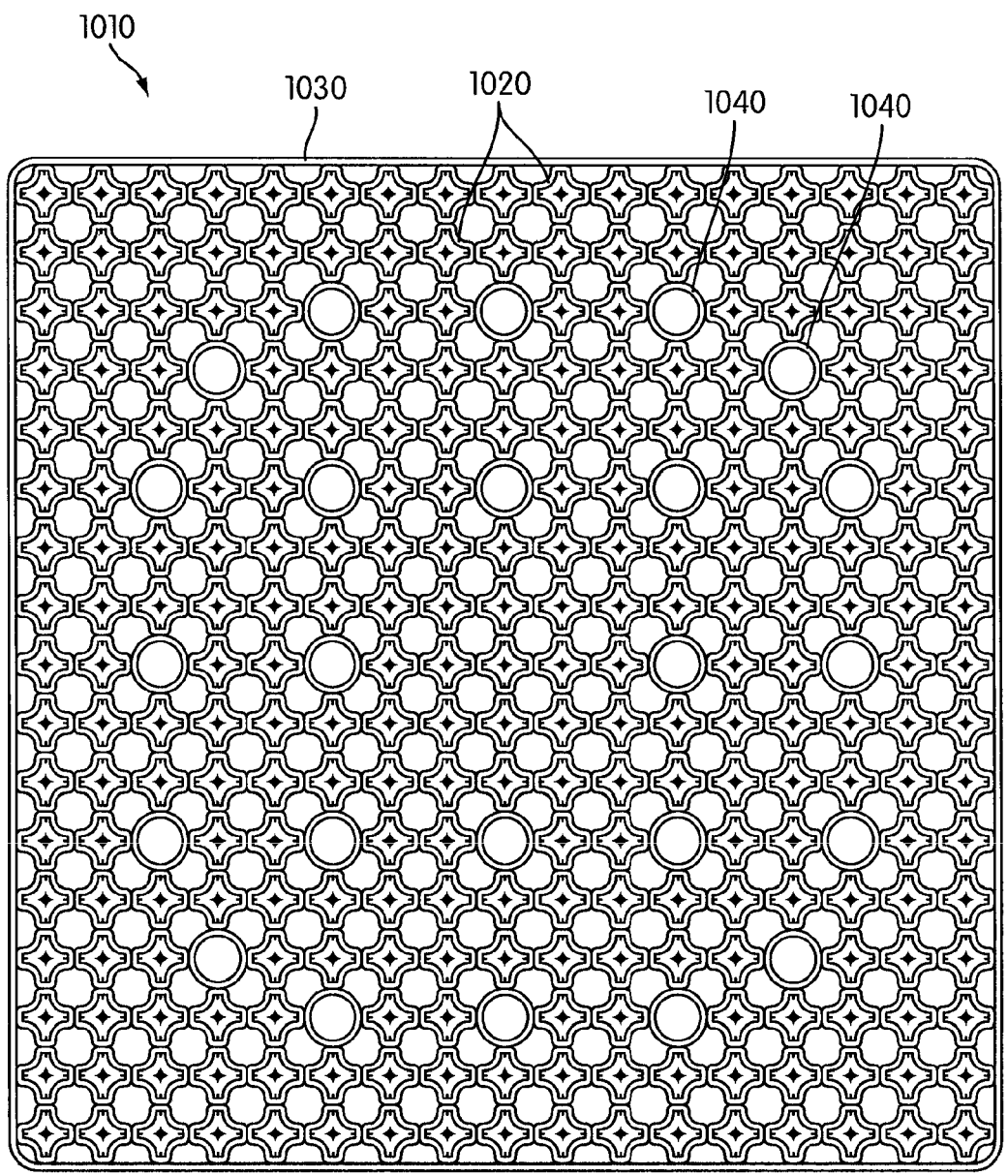
FIG. 10 is a cross-sectional view of a fuel assembly according to an embodiment of the present invention, the cross-section being taken in a self-spacing plane.
Figure 11:
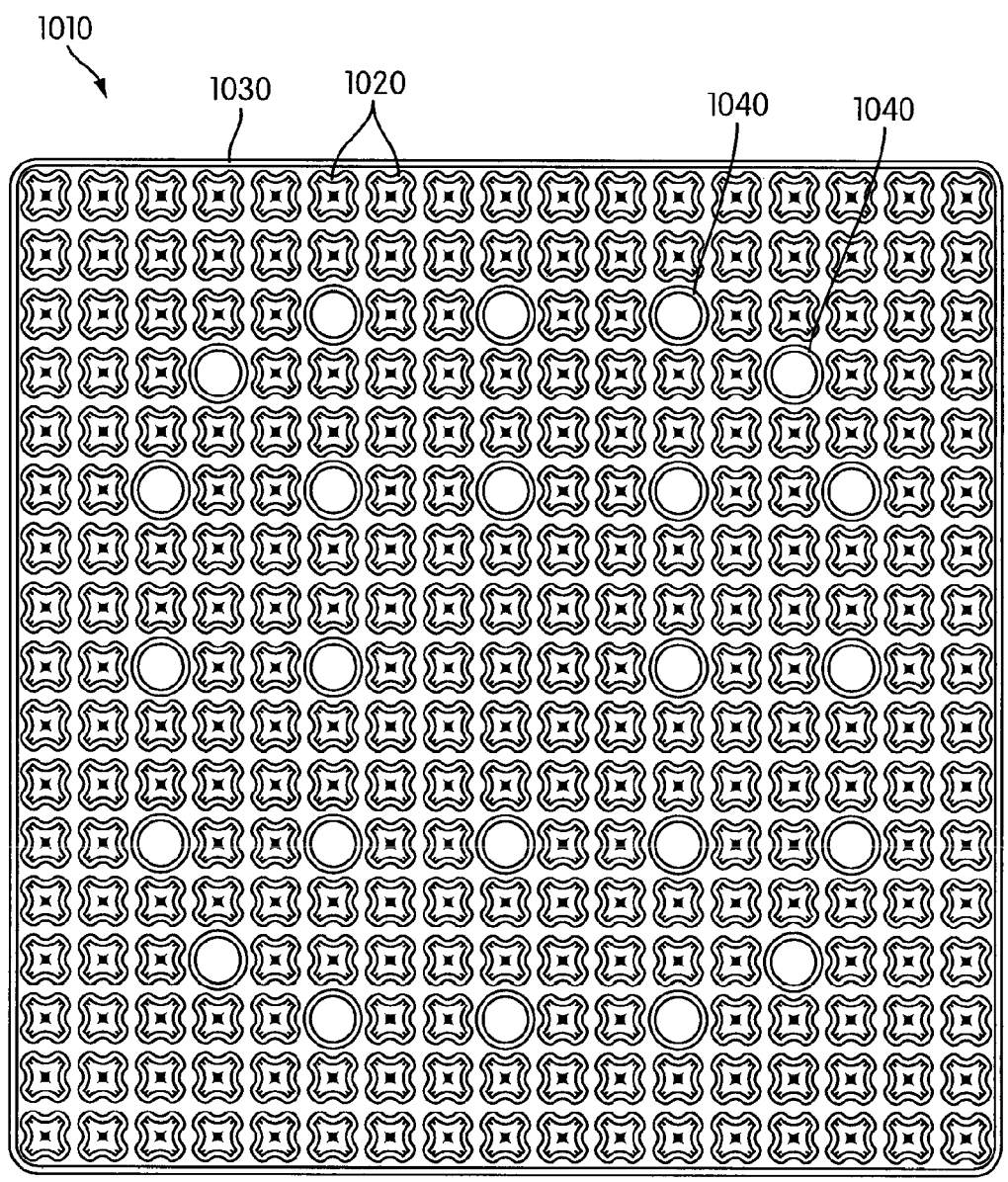
FIG. 11 is a cross-sectional view of the fuel assembly of FIG. 10, the cross-section being taken in a plane that is shifted by ⅛ of a twist of the fuel elements from the view in FIG. 10.
Figure 12:
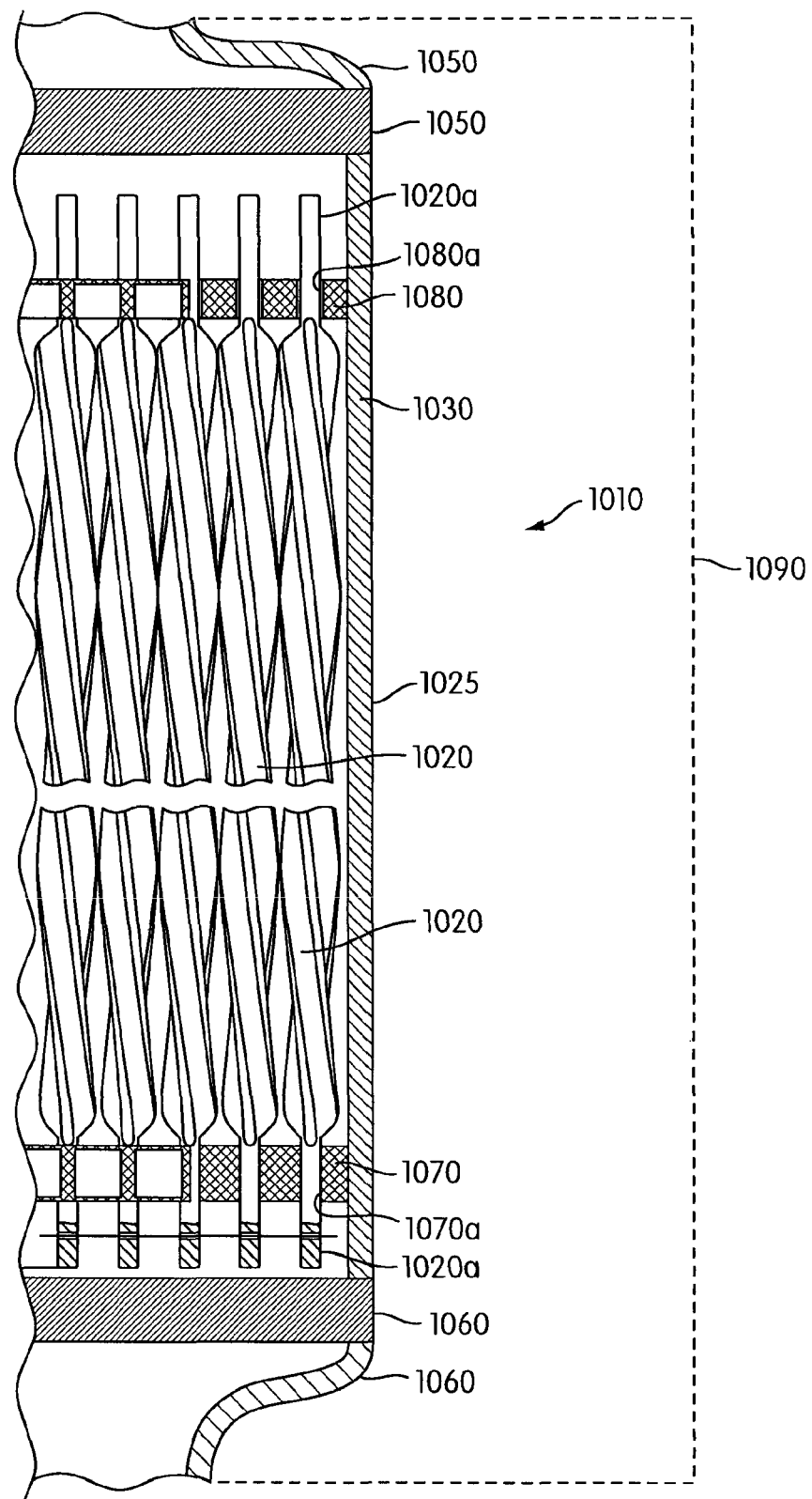
FIG. 12 is a cross-sectional view of the fuel assembly of FIG. 10, taken in a plane that is parallel to the axial direction of the fuel assembly.

FIGS. 10-12 illustrate a fuel assembly 1010 according to an embodiment of the present invention. As shown in FIG. 12, the fuel assembly 1010 comprises a plurality of fuel elements 1020 supported by a frame 1025.

As shown in FIG. 12, the frame 1025 comprises a shroud 1030, guide tubes 1040, an upper nozzle 1050, a lower nozzle 1060, a lower tie plate 1070, an upper tie plate 1080, and/or other structure(s) that enable the assembly 1010 to operate as a fuel assembly in a nuclear reactor. One or more of these components of the frame 1025 may be omitted according to various embodiments without deviating from the scope of the present invention.

As shown in FIG. 12, the shroud 1030 mounts to the upper nozzle 1050 and lower nozzle 1060. The lower nozzle 1060 (or other suitable structure of the assembly 1010) is constructed and shaped to provide a fluid communication interface between the assembly 1010 and the reactor 1090 into which the assembly 1010 is placed so as to facilitate coolant flow into the reactor core through the assembly 1010 via the lower nozzle 1060. The upper nozzle 1050 facilitates direction of the heated coolant from the assembly 1010 to the power plant's steam generators (for PWRs), turbines (for BWRs), etc. The nozzles 1050, 1060 have a shape that is specifically designed to properly mate with the reactor core internal structure.

As shown in FIG. 12, the lower tie plate 1070 and upper tie plate 1080 may be rigidly mounted (e.g., via welding, suitable fasteners (e.g., bolts, screws), etc.) to the shroud 1030 or lower nozzle 1060 (and/or other suitable structural components of the assembly 1010).

The fuel elements 1020 may be identical to or substantially similar to the above-discussed elements 10. In the illustrated embodiment, the elements 1020 differ from the elements 10 by including four, rather than three, lobes. According to various embodiments of the invention, the elements 1020 may be used in the seed region of the assembly 2 in place of the elements 10. Conversely, according to various embodiments, the elements 10 may be used in the assembly 1010 in place of the elements 1020.

Lower axial ends of the elements 1020 form pins 1020a that fit into holes 1070a in the lower tie plate 1070 to support the elements 1020 and help maintain proper element 1020 spacing. The pins 1020a mount to the holes 1070a in a manner that prevents the elements 1020 from rotating about their axes or axially moving relative to the lower tie plate 1070. This restriction on rotation helps to ensure that contact points between adjacent elements 1020 all occur at the same axial positions along the elements 1020 (e.g., at self-spacing planes discussed below). The connection between the pins 1020a and holes 1070a may be created via welding, interference fit, mating non-cylindrical features that prevent rotation (e.g., keyway and spline), and/or any other suitable mechanism for restricting axial and/or rotational movement of the elements 1020 relative to the lower tie plate 1070. The lower tie plate 1070 includes axially extending channels (e.g., a grid of openings) through which coolant flows toward the elements 1020.

Upper axial ends of the elements 1020 form pins 1020a that freely fit into holes 1080a in the upper tie plate 1080 to permit the upper pins 1020a to freely axially move upwardly through to the upper tie plate 1080 while helping to maintain the spacing between elements 1020. As a result, when the elements 1020 axially grow during fission, the elongating elements 1020 can freely extend further into the upper tie plate 1080.

Figure 13:
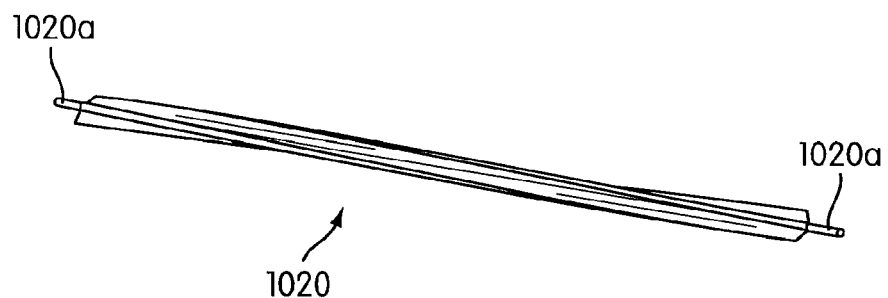
FIG. 13 is a perspective view of a fuel element of the fuel assembly of FIG. 10.

As shown in FIG. 13, the pins 1020a transition into a central portion of the element 1020.

Figure 14:
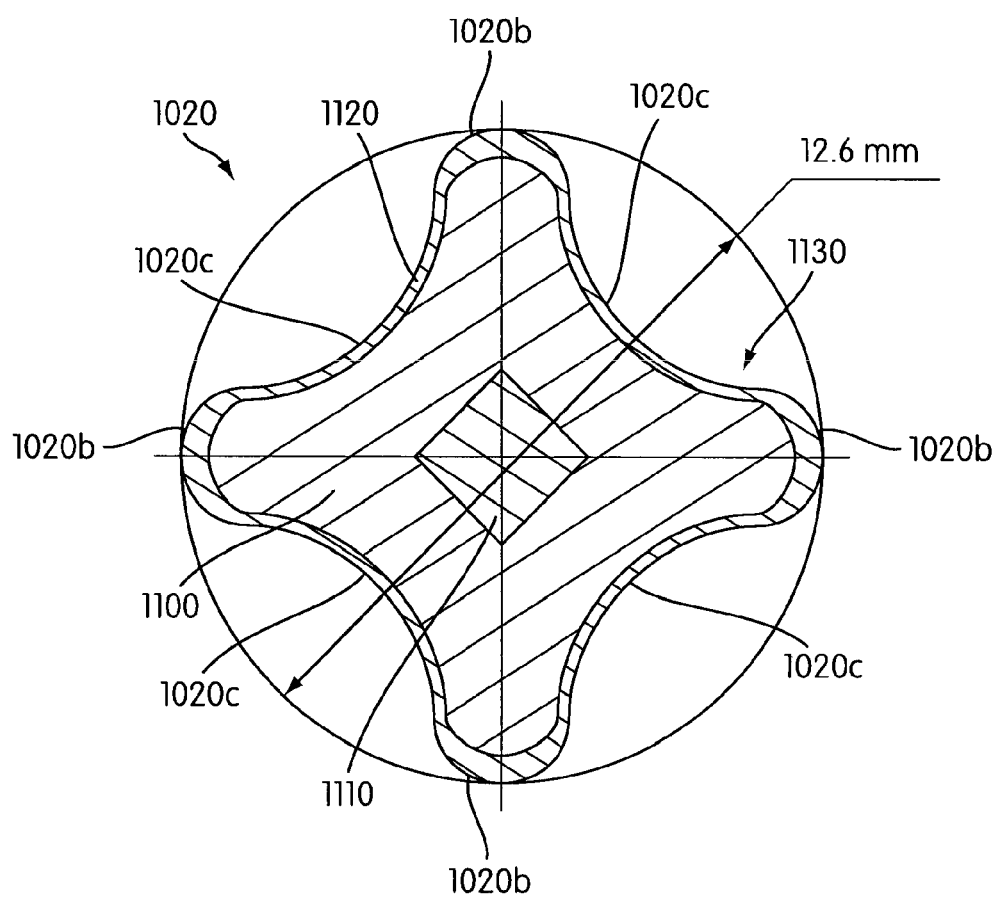
FIG. 14 is a cross-sectional view of the fuel element in FIG. 13.

FIGS. 13 and 14 illustrate an individual fuel element/rod 1020 of the assembly 1010. As shown in FIG. 14, the elongated central portion of the fuel element 1020 has a four-lobed cross-section. A cross-section of the element 1020 remains substantially uniform over the length of the central portion of the element 1020. Each fuel element 1020 has a fuel kernel 1100, which includes a refractory metal and fuel material that includes fissile material.

A displacer 1110 that comprises a refractory metal is placed along the longitudinal axis in the center of the fuel kernel 1100. The displacer 1110 helps to limit the temperature in the center of the thickest part of the fuel element 1020 by displacing fissile material that would otherwise occupy such space and minimize variations in heat flux along the surface of the fuel element. According to various embodiments, the displacer 1110 may be eliminated altogether.

As shown in FIG. 14, the fuel kernel 1100 is enclosed by a refractory metal cladding 1120. The cladding 1120 is preferably thick enough, strong enough, and flexible enough to endure the radiation-induced swelling of the kernel 1100 without failure (e.g., without exposing the kernel 1100 to the environment outside the cladding 1120). According to one or more embodiments, the entire cladding 1120 is at least 0.3 mm, 0.4 mm, 0.5 mm, and/or 0.7 mm thick. The entire cladding 1120 may be less than 1 mm thick. According to one or more embodiments, the cladding 1120 thickness is at least 0.4 mm in order to reduce a chance of swelling-based failure, oxidation based failure, and/or any other failure mechanism of the cladding 1120.

The cladding 1120 may have a substantially uniform thickness in the annular direction (i.e., around the perimeter of the cladding 1120 as shown in the cross-sectional view of FIG. 14) and over the axial/longitudinal length of the kernel 1100 (as shown in FIG. 13). Alternatively, as shown in FIG. 14, according to one or more embodiments, the cladding 1120 is thicker at the tips of the lobes 1020b than at the concave intersection 1020c between the lobes 1020b. For example, according to one or more embodiments, the cladding 1120 at the tips of the lobes 1020b is at least 10%, 20%, 30%, 40%, 50%, 60%, 70%, 80%, 90%, 100%, 125%, and/or 150% thicker than the cladding 1120 at the concave intersections 1020c. The thicker cladding 1120 at the tips of the lobes 1020b provides improved wear resistance at the tips of the lobes 1020b where adjacent fuel elements 1020 touch each other at the self-spacing planes (discussed below).

The refractory metal used in the displacer 1110, the fuel kernel 1100, and the cladding 1120 comprises zirconium according to one or more embodiments of the invention. As used herein, the term zirconium means pure zirconium or zirconium in combination with other alloy material(s). However, other refractory metals may be used instead of zirconium without deviating from the scope of the present invention (e.g., niobium, molybdenum, tantalum, tungsten, rhenium, titanium, vanadium, chromium, zirconium, hafnium, ruthenium, osmium, iridium, and/or other metals). As used herein, the term "refractory metal" means any metal/alloy that has a melting point above 1800 degrees Celsius (2073K).

Moreover, in certain embodiments, the refractory metal may be replaced with another non-fuel metal, e.g., aluminum. However, the use of a non-refractory non-fuel metal is best suited for reactor cores that operate at lower temperatures (e.g., small cores that have a height of about 1 meter and an electric power rating of 100 MWe or less). Refractory metals are preferred for use in cores with higher operating temperatures.

As shown in FIG. 14, the central portion of the fuel kernel 1100 and cladding 1120 has a four-lobed profile forming spiral spacer ribs 1130. The displacer 1110 may also be shaped so as to protrude outwardly at the ribs 1130 (e.g., corners of the square displacer 1110 are aligned with the ribs 1130). According to alternative embodiments of the present invention, the fuel elements 1020 may have greater or fewer numbers of ribs 1130 without deviating from the scope of the present invention. For example, as generally illustrated in FIG. 5 of U.S. Patent Application Publication No. 2009/0252278 A1, a fuel element may have three ribs/lobes, which are preferably equally circumferentially spaced from each other. The number of lobes/ribs 1130 may depend, at least in part, on the shape of the fuel assembly 1010. For example, a four-lobed element 1020 may work well with a square cross-sectioned fuel assembly 1010 (e.g., as is used in the AP-1000). In contrast, a three-lobed fuel element may work well with a hexagonal fuel assembly (e.g., as is used in the VVER).

As shown in FIG. 13, the displacer has a cross-sectional shape of a square regular quadrilateral with the corners of the square regular quadrilateral being aligned with the ribs 1130. The displacer 1110 forms a spiral that follows the spiral of the ribs 1130 so that the corners of the displacer 1110 remain aligned with the ribs 1130 along the axial length of the fuel kernel 1100. In alternative embodiments with greater or fewer ribs 1130, the displacer 1110 preferably has the cross-sectional shape of a regular polygon having as many sides as the element 1020 has ribs.

Figure 15:
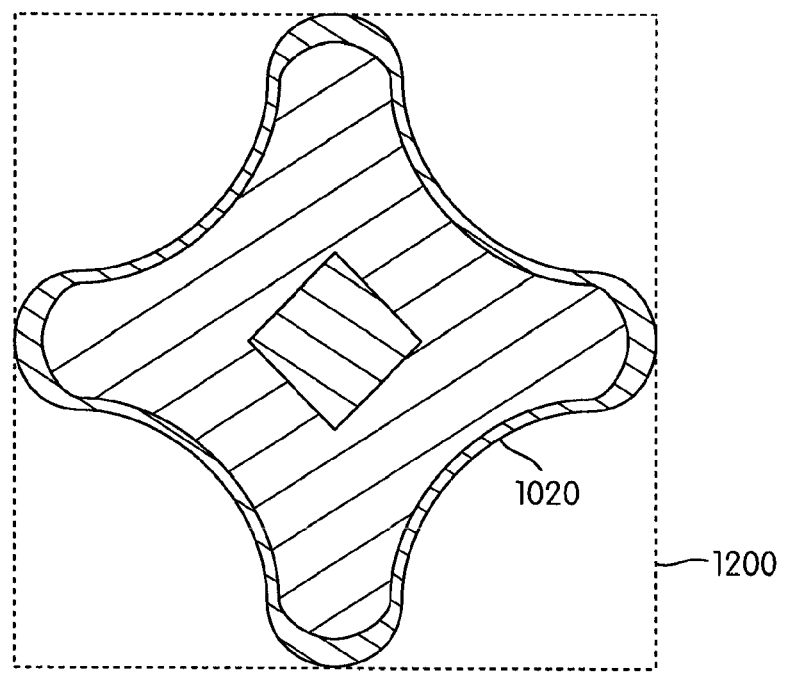
FIG. 15 is a cross-sectional view of the fuel element in FIG. 13, circumscribed within a regular polygon.

As shown in FIG. 15, the cross-sectional area of the central portion of the element 1020 is preferably substantially smaller than the area of a square 1200 in which the tip of each of the ribs 1130 is tangent to one side of the square 1200. In more generic terms, the cross-sectional area of an element 1020 having n ribs is preferably smaller than the area of a regular polygon having n sides in which the tip of each of the ribs 1130 is tangent to one side of the polygon. According to various embodiments, a ratio of the area of the element 1020 to the area of the square (or relevant regular polygon for elements 1020 having greater or fewer than four ribs 1130) is less than 0.7, 0.6, 0.5, 0.4, 0.35, and/or 0.3. As shown in FIG. 10, this area ratio approximates how much of the available space within the shroud 1030 is taken up by the fuel elements 1020, such that a lower ratio means that more space is advantageously available for coolant, which also acts as a neutron moderator and which increases the moderator-to-fuel ratio (important for neutronics), reduces hydraulic drag, and increases the heat transfer from the elements 1020 to the coolant. According to various embodiments, the resulting moderator to fuel ratio is at least 2.0, 2.25, 2.5, 2.75, and/or 3.0 (as opposed to 1.96 when conventional cylindrical uranium oxide rods are used). Similarly, according to various embodiments, the fuel assembly 1010 flow area is increased by over 16% as compared to the use of one or more conventional fuel assemblies that use cylindrical uranium oxide rods. The increased flow area may decrease the coolant pressure drop through the assembly 1010 (relative to conventional uranium oxide assemblies), which may have advantages with respect to pumping coolant through the assembly 1010.

As shown in FIG. 13, the element 1020 is axially elongated. In the illustrated embodiment, each element 1020 is a full-length element and extends the entire way from lower tie plate 1070 at or near the bottom of the assembly 1010 to the upper tie plate 1080 at or near the top of the assembly 1010. According to various embodiments and reactor designs, this may result in elements 1020 that are anywhere from 1 meter long (for compact reactors) to over 4 meters long. Thus, for typical reactors, the elements 1020 may be between 1 and 5 meters long. However, the elements 1020 may be lengthened or shortened to accommodate any other sized reactor without deviating from the scope of the present invention.

While the illustrated elements 1020 are themselves full length, the elements 1020 may alternatively be segmented, such that the multiple segments together make a full length element. For example, 4 individual 1 meter element segments 1020 may be aligned end to end to effectively create the full-length element. Additional tie plates 1070, 1080 may be provided at the intersections between segments to maintain the axial spacing and arrangement of the segments.

According to one or more embodiments, the fuel kernel 1100 comprises a combination of a refractory metal/alloy and fuel material. The refractory metal/alloy may comprise a zirconium alloy. The fuel material may comprise low enriched uranium (e.g., U235, U233), plutonium, or thorium combined with low enriched uranium as defined below and/or plutonium. As used herein, "low enriched uranium" means that the whole fuel material contains less than 20% by weight fissile material (e.g., uranium-235 or uranium-233). According to various embodiments, the uranium fuel material is enriched to between 1% and 20%, 5% and 20%, 10% and 20%, and/or 15% and 20% by weight of uranium-235. According to one or more embodiments, the fuel material comprises 19.7% enriched uranium-235.

According to various embodiments, the fuel material may comprise a 3-10%, 10-40%, 15-35%, and/or 20-30% volume fraction of the fuel kernel 1100. According to various embodiments, the refractory metal may comprise a 60-99%, 60-97%, 70-97%, 60-90%, 65-85%, and/or 70-80% volume fraction of the fuel kernel 1100. According to one or more embodiments, volume fractions within one or more of these ranges provide an alloy with beneficial properties as defined by the material phase diagram for the specified alloy composition. The fuel kernel 1100 may comprise a Zr—U alloy that is a high-alloy fuel (i.e., relatively high concentration of the alloy constituent relative to the uranium constituent) comprised of either δ-phase $UZr_2$, or a combination of δ-phase $UZr_2$ and α-phase Zr. According to one or more embodiments, the δ-phase of the U—Zr binary alloy system may range from a zirconium composition of approximately 65-81 volume percent (approximately 63 to 80 atom percent) of the fuel kernel 1100. One or more of these embodiments have been found to result in low volumetric, irradiation-induced swelling of the fuel element 1020. According to one or more embodiments, such swelling may be significantly less than would occur if low alloy (α-phase only) compositions were used (e.g., at least 10%, 20%, 30%, 50%, 75%, 100%, 200%, 300%, 500%, 1000%, 1200%, 1500%, or greater reduction in volume percent swelling per atom percent burnup than if a low alloy α-phase U-10Zr fuel was used). According to one or more embodiments of the present invention, irradiation-induced swelling of the fuel element 1020 or kernel 1100 thereof may be less than 20, 15, 10, 5, 4, 3, and/or 2 volume percent per atom percent burnup. According to one or more embodiments, swelling is expected to be around one volume percent per atom percent burnup.

According to one or more alternative embodiments of the present invention, the fuel kernel is replaced with a plutonium-zirconium binary alloy with the same or similar volume percentages as with the above-discussed U—Zr fuel kernels 1100, or with different volume percentages than with the above-discussed U—Zr fuel kernels 1100. For example, the plutonium fraction in the kernel 1100 may be substantially less than a corresponding uranium fraction in a corresponding uranium-based kernel 1100 because plutonium typically has about 60-70% weight fraction of fissile isotopes, while LEU uranium has 20% or less weight fraction of fissile U-235 isotopes. According to various embodiments, the plutonium volume fraction in the kernel 1100 may be less than 15%, less than 10%, and/or less than 5%, with the volume fraction of the refractory metal being adjusted accordingly.

The use of a high-alloy kernel 1100 according to one or more embodiments of the present invention may also result in the advantageous retention of fission gases during irradiation. Oxide fuels and low-alloy metal fuels typically exhibit significant fission gas release that is typically accommodated by the fuel design, usually with a plenum within the fuel rod to contain released fission gases. The fuel kernel 1100 according to one or more embodiments of the present invention, in contrast, does not release fission gases. This is in part due to the low operating temperature of the fuel kernel 1100 and the fact that fission gas atoms (specifically Xe and Kr) behave like solid fission products. Fission gas bubble formation and migration along grain boundaries to the exterior of the fuel kernel 1100 does not occur according to one or more embodiments. At sufficiently high temperatures according to one or more embodiments, small (a few micron diameter) fission gas bubbles may form within the grains of the kernel material. However, these bubbles remain isolated within the fuel kernel 1100 and do not form an interconnected network that would facilitate fission gas release, according to one or more embodiments of the present invention. The metallurgical bond between the fuel kernel 1100 and cladding 1120 may provide an additional barrier to fission gas release.

According to various embodiments, the fuel kernel 1100 (or the cladding 1120 or other suitable part of the fuel element 1020) of one or more of the fuel elements 1020 can be alloyed with a burnable poison such as gadolinium, boron, erbium or other suitable neutron absorbing material to form an integral burnable poison fuel element. Different fuel elements 1020 within a fuel assembly 1010 may utilize different burnable poisons and/or different amounts of burnable poison. For example, some of fuel elements 1020 of a fuel assembly 1010 (e.g., less than 75%, less than 50%, less than 20%, 1-15%, 1-12%, 2-12%, etc.) may include kernels 1100 with 25, 20, and/or 15 weight percent or less Gd (e.g., 1-25 weight percent, 1-15 weight percent, 5-15 weight percent, etc.). Other fuel elements 1020 of the fuel assembly 1010 (e.g., 10-95%, 10-50%, 20-50%, a greater number of the fuel elements 1020 than the fuel elements 1020 that utilize Gd) may include kernels 1100 with 10 or 5 weight percent or less Er (e.g., 0.1-10.0 weight percent, 0.1 to 5.0 weight percent etc.).

According to various embodiments, the burnable poison displaces the fuel material (rather than the refractory metal) relative to fuel elements 1020 that do not include burnable poison in their kernels 1100. For example, according to one embodiment of a fuel element 1020 whose kernel 1100 would otherwise include 65 volume percent zirconium and 35 volume percent uranium in the absence of a poison, the fuel element 1020 includes a kernel 1100 that is 16.5 volume percent Gd, 65 volume percent zirconium, and 18.5 volume percent uranium. According to one or more other embodiments, the burnable poison instead displaces the refractory metal, rather than the fuel material. According to one or more other embodiments, the burnable poison in the fuel kernel 1100 displaces the refractory metal and the fuel material proportionally. Consequently, according to various of these embodiments, the burnable poison within the fuel kernel 1100 may be disposed in the δ-phase of $UZr_2$ or α-phase of Zr such that the presence of the burnable poison does not change the phase of the $UZr_2$ alloy or Zr alloy in which the burnable poison is disposed.

Fuel elements 1020 with a kernel 1100 with a burnable poison may make up a portion (e.g., 0-100%, 1-99%, 1-50%, etc.) of the fuel elements 1020 of one or more fuel assemblies 1010 used in a reactor core. For example, fuel elements 1020 with burnable poison may be positioned in strategic locations within the fuel assembly lattice of the assembly 1010 that also includes fuel elements 1020 without burnable poison to provide power distribution control and to reduce soluble boron concentrations early in the operating cycle. Similarly, select fuel assemblies 1010 that include fuel elements 1020 with burnable poison may be positioned in strategic locations within the reactor core relative to assemblies 1010 that do not include fuel elements 1020 with burnable poison to provide power distribution control and to reduce soluble boron concentrations early in the operating cycle. The use of such integral burnable absorbers may facilitate the design of extended operating cycles.

Alternatively and/or additionally, separate non-fuel bearing burnable poison rods may be included in the fuel assembly 1010 (e.g., adjacent to fuel elements 1020, in place of one or more fuel elements 1020, inserted into guide tubes in fuel assemblies 1010 that do not receive control rods, etc.). In one or more embodiments, such non-fuel burnable poison rods can be designed into a spider assembly similar to that which is used in the Babcock and Wilcox or Westinghouse designed reactors (referred to as burnable poison rod assemblies (BPRA)). These then may be inserted into the control rod guide tubes and locked into select fuel assemblies 1010 where there are no control banks for the initial cycle of operation for reactivity control. When the burnable poison cluster is used it may be removed when the fuel assembly is relocated for the next fuel cycle. According to an alternative embodiment in which the separate non-fuel bearing burnable poison rods are positioned in place of one or more fuel elements 1020, the non-fuel burnable poison rods remain in the fuel assembly 1010 and are discharged along with other fuel elements 1020 when the fuel assembly 1010 reaches its usable life.

The fuel elements 1020 are manufactured via co-extrusion (also referred to as joint extrusion). Typically, the powdered refractory metal and powdered fuel material (as well as the powdered burnable poison, if included in the kernel 1100) for the fuel kernel 1100 are mixed, the displacer 1110 is positioned within the powder mixture, and then the combination of powder and displacer 1110 is pressed and sintered into fuel core stock (e.g., in a mold that is heated to varying extents over various time periods so as to sinter the mixture). The fuel core stock (including the displacer 1110 and the sintered fuel kernel 1100 material) is inserted into a hollow cladding 1120 tube that has a sealed tube base and an opening on the other end. The opening on the other end is then sealed by an end plug made of the same material as the cladding and the entire unit is then co-extruded under temperature and pressure through a die set to create the element 1020. The process results in the cladding 1120 being metallurgically bonded to the fuel kernel 1100, which reduces the risk of delamination of the cladding 1120 from the fuel kernel 1100. The tube and end plug of the cladding 1120 metallurgically bond to each other to seal the fuel kernel 1100 within the cladding 1120. The high melting points of refractory metals used in the fuel elements 1020 tend to make powder metallurgy the method of choice for fabricating components from these metals.

As shown in FIG. 13, the axial coiling pitch of the spiral ribs 1130 is selected according to the condition of placing the axes of adjacent fuel elements 1020 with a spacing equal to the width across corners in the cross section of a fuel element and may be 5% to 20% of the fuel element 1020 length. According to one embodiment, the pitch (i.e., the axial length over which a lobe/rib makes a complete rotation) is about 21.5 cm, while the full active length of the element 1020 is about 420 cm. As shown in FIG. 12, stability of the vertical arrangement of the fuel elements 1020 is provided: at the bottom—by the lower tie plate 1070; at the top—by the upper tie plate 1080; and relative to the height of the core—by the shroud 1030. As shown in FIG. 10, the fuel elements 1020 have a circumferential orientation such that the lobed profiles of any two adjacent fuel elements 1020 have a common plane of symmetry which passes through the axes of the two adjacent fuel elements 1020 in at least one cross section of the fuel element bundle.

As shown in FIG. 10, the helical twist of the fuel elements 1020 in combination with their orientation ensures that there exists one or more self-spacing planes. As shown in FIG. 10, in such self spacing planes, the ribs of adjacent elements 1020 contact each other to ensure proper spacing between such elements 1020. Thus, the center-to-center spacing of elements 1020 will be about the same as the corner-to-corner width of each element 1020 (12.6 mm in the element illustrated in FIG. 14). Depending on the number of lobes 1020b in each fuel element 1020 and the relative geometrical arrangement of the fuel elements 1020, all adjacent fuel elements 1020 or only a portion of the adjacent fuel elements 1020 will contact each other. For example, in the illustrated four-lobed embodiment, each fuel element 1020 contacts all four adjacent fuel elements 1020 at each self-spacing plane. However, in a three-lobed fuel element embodiment in which the fuel elements are arranged in a hexagonal pattern, each fuel element will only contact three of the six adjacent fuel elements in a given self-spacing plane. The three-lobed fuel element will contact the other three adjacent fuel elements in the next axially-spaced self-spacing plane (i.e., ⅙ of a turn offset from the previous self-spacing plane).

In an n-lobed element 1020 in which n fuel elements are adjacent to a particular fuel element 1020, a self-spacing plane will exist every 1/n helical turn (e.g., every ¼ helical turn for a four-lobed element 1020 arranged in a square pattern such that four other fuel elements 1020 are adjacent to the fuel element 1020; every ⅓ helical turn for a three-lobed element in which three fuel elements are adjacent to the fuel element (i.e., every 120 degrees around the perimeter of the fuel element)). The pitch of the helix may be modified to create greater or fewer self-spacing planes over the axial length of the fuel elements 1020. According to one embodiment, each four-lobed fuel element 1020 includes multiple twists such that there are multiple self-spacing planes over the axial length of the bundle of fuel elements 1020.

In the illustrated embodiment, all of the elements 1020 twist in the same direction. However, according to an alternative embodiment, adjacent elements 1020 may twist in opposite directions without deviating from the scope of the present invention.

The formula for the number of self-spacing planes along the fuel rod length is as follows:

$$N = n*L/h, \text{ where:}$$

L—Fuel rod length
n—Number of lobes (ribs) and the number of fuel elements adjacent to a fuel element
h—Helical twist pitch
The formula is slightly different if the number of lobes and the number of fuel elements adjacent to a fuel element are not the same.

As a result of such self-spacing, the fuel assembly 1010 may omit spacer grids that may otherwise have been necessary to assure proper element spacing along the length of the assembly 1010. By eliminating spacer grids, coolant may more freely flow through the assembly 1010, which advantageously increases the heat transfer from the elements 1020 to the coolant. However, according to alternative embodiments of the present invention, the assembly 1010 may include spacer grid(s) without deviating from the scope of the present invention.

As shown in FIG. 12, the shroud 1030 forms a tubular shell that extends axially along the entire length of the fuel elements 1020 and surrounds the elements 1020. However, according to an alternative embodiment of the present invention, the shroud 1030 may comprise axially-spaced bands, each of which surrounds the fuel elements 1020. One or more such bands may be axially aligned with the self-spacing planes or between successive self-spacing planes. Axially extending corner supports may extend between such axially spaced bands to support the bands, maintain the bands' alignment, and strengthen the assembly. Alternatively and/or additionally, holes may be cut into the otherwise tubular/polygonal shroud 1030 in places where the shroud 1030 is not needed or desired for support.

As shown in FIG. 10, the cross-sectional perimeter of the shroud 1030 has a shape that accommodates the reactor in which the assembly 1010 is used. In reactors such as the AP-1000 that utilize square fuel assemblies, the shroud has a square cross-section. However, the shroud 1030 may alternatively take any suitable shape depending on the reactor in which it is used (e.g., a hexagonal shape for use in a VVER reactor (e.g., as shown in FIG. 1 of U.S. Patent Application Publication No. 2009/0252278 A1).

The guide tubes 1040 provide for the insertion of control absorber elements based on boron carbide ($B_4C$), silver-indium-cadmium alloy (AgInCd), dysprosium titanate ($Dy_2O_3 \cdot TiO_2$) or other suitable alloys or materials used for reactivity control (not shown) and burnable absorber elements based on boron carbide, gadolinium oxide ($Gd_2O_3$) or other suitable materials (not shown) and are placed in the upper nozzle 1050 with the capability of elastic axial displacement. The guide tubes 1040 may comprise a zirconium alloy. For example, the guide tube 1040 arrangement shown in FIG. 10 is in an arrangement used in the AP-1000 reactor (e.g., 24 guide tubes arranged in two annular rows at the positions shown in the 17×17 grid).

The shape, size, and features of the frame 1025 depend on the specific reactor core for which the assembly 1010 is to be used. Thus, one of ordinary skill in the art would understand how to make appropriately shaped and sized frame for the fuel assembly 1010. For example, the frame 1025 may be shaped and configured to fit into a reactor core of a conventional nuclear power plant in place of a conventional uranium oxide or mixed oxide fuel assembly for that plant's reactor core. The nuclear power plant may comprise a reactor core design that was in actual use before 2010 (e.g., 2, 3 or 4-loop PWRs; BWR-4). Alternatively, the nuclear power plant may be of an entirely new design that is specifically tailored for use with the fuel assembly 1010.

As explained above, the illustrated fuel assembly 1010 is designed for use in an AP-1000 or EPR reactor. The assembly includes a 17×17 array of fuel elements 1020, 24 of which are replaced with guide tubes 1040 as explained above for a total of 265 fuel elements 1020 in EPR or 264 fuel elements 1020 in AP-1000 (in the AP-1000, in addition to the 24 fuel elements being replaced with the guide tubes, a central fuel element is also replaced with an instrumented tube).

The elements 1020 preferably provide 100% of the overall fissile material of the fuel assembly 1010. Alternatively, some of the fissile material of the assembly 1010 may be provided via fuel elements other than the elements 1020 (e.g., non-lobed fuel elements, uranium oxide elements, elements having fuel ratios and/or enrichments that differ from the elements 1020). According to various such alternative embodiments, the fuel elements 1020 provide at least 50%, 60%, 70%, 75%, 80%, 85%, 90%, and/or 95% by volume of the overall fissile material of the fuel assembly 1010.

Use of the metal fuel elements 1020 according to one or more embodiments of the present invention facilitate various advantages over the uranium oxide or mixed oxide fuel conventionally used in light water nuclear reactors (LWR) (including boiling water reactors and pressurized water reactors) such as the Westinghouse-designed AP-1000, AREVA-designed EPR reactors, or GE-designed ABWR. For example, according to one or more embodiments, the power rating for an LWR operating on standard uranium oxide or mixed oxide fuel could be increased by up to about 30% by substituting the all-metal fuel elements 1020 and/or fuel assembly 1010 for standard uranium oxide fuel and fuel assemblies currently used in existing types of LWRs or new types of LWRs that have been proposed.

One of the key constraints for increasing power rating of LWRs operating on standard uranium oxide fuel has been the small surface area of cylindrical fuel elements that such fuel utilizes. A cylindrical fuel element has the lowest surface area to volume ratio for any type of fuel element cross-section profile. Another major constraint for standard uranium oxide fuel has been a relatively low burnup that such fuel elements could possibly reach while still meeting acceptable fuel performance criteria. As a result, these factors associated with standard uranium oxide or mixed oxide fuel significantly limit the degree to which existing reactor power rating could be increased.

One or more embodiments of the all-metal fuel elements 1020 overcome the above limitations. For example, as explained above, the lack of spacer grids may reduce hydraulic resistance, and therefore increase coolant flow and heat flux from the elements 1020 to the primary coolant. The helical twist of the fuel elements 1020 may increase coolant intermixing and turbulence, which may also increase heat flux from the elements 1020 to the coolant.

Preliminary neutronic and thermal-hydraulic analyses have shown the following according to one or more embodiments of the present invention:

The thermal power rating of an LWR reactor could be increased by up to 30.7% or more (e.g., the thermal power rating of an EPR reactor could be increased from 4.59 GWth to 6.0 GWth).

With a uranium volume fraction of 23% in the uranium-zirconium mixture and uranium-235 enrichment of 19.7%, an EPR reactor core with a four-lobe metallic fuel element 1020 configuration could operate for about 500-520 effective full power days (EFPDs) at the increased thermal power rating of 6.0 GWth if 72 fuel assemblies were replaced per batch (once every 18 months) or 540-560 EFPDs if 80 fuel assemblies were replaced per batch (once every 18 months).

Due to the increased surface area in the multi-lobe fuel element, even at the increased power rating of 6.0 GWth, the average surface heat flux of the multi-lobe fuel element is shown to be 4-5% lower than that for cylindrical uranium oxide fuel elements operating at the thermal power rating of 4.59 GWth. This could provide an increased safety margin with respect to critical heat flux (e.g., increased departure from nucleate boiling margin in PWRs or maximum fraction limiting critical power ratio in BWRs). Further, this could allow a possibility of using 12 fuel elements per assembly with burnable poisons. Burnable poisons could be used to remove excess reactivity at the beginning of cycle or to increase the Doppler Effect during the heat-up of the core.

Thus, the fuel assemblies 1010 may provide greater thermal power output at a lower fuel operating temperature than conventional uranium oxide or mixed oxide fuel assemblies.

To utilize the increased power output of the assembly 1010, conventional power plants could be upgraded (e.g., larger and/or additional coolant pumps, steam generators, heat exchangers, pressurizers, turbines). Indeed, according to one or more embodiments, the upgrade could provide 30-40% more electricity from an existing reactor. Such a possibility may avoid the need to build a complete second reactor. The modification cost may quickly pay for itself via increased electrical output. Alternatively, new power plants could be constructed to include adequate features to handle and utilize the higher thermal output of the assemblies 1010.

Further, one or more embodiments of the present invention could allow an LWR to operate at the same power rating as with standard uranium oxide or mixed oxide fuel using existing reactor systems without any major reactor modifications. For example, according to one embodiment:

An EPR would have the same power output as if conventional uranium-oxide fuel were used: 4.59 GWt;

With a uranium volume fraction of 23% in the uranium-zirconium mixture and uranium-235 enrichment of approximately 15%, an EPR reactor core with a four-lobe metallic fuel element 1020 configuration could operate for about 500-520 effective full power days (EFPDs) if 72 fuel assemblies were replaced per batch or 540-560 EFPDs if 80 fuel assemblies were replaced per batch.

The average surface heat flux for the elements 1020 is reduced by approximately 30% compared to that for cylindrical rods with conventional uranium oxide fuel (e.g., 39.94 v. 57.34 W/cm$^2$). Because the temperature rise of the coolant through the assembly 1010 (e.g., the difference between the inlet and outlet temperature) and the coolant flow rate through the assembly 1010 remain approximately the same relative to conventional fuel assemblies, the reduced average surface heat flux results in a corresponding reduction in the fuel rod surface temperature that contributes to increased safety margins with respect to critical heat flux (e.g., increased departure from nucleate boiling margin in PWRs or maximum fraction limiting critical power ratio in BWRs).

Additionally and/or alternatively, fuel assemblies 1010 according to one or more embodiments of the present invention can be phased/laddered into a reactor core in place of conventional fuel assemblies. During the transition period, fuel assemblies 1010 having comparable neutronic and thermal characteristics as conventional fuel assemblies can gradually replace such conventional fuel assemblies over sequential fuel changes without changing the operating parameters of the power plant. Thus, fuel assemblies 1010 can be retrofitted into an existing core that may be important during a transition period (i.e., start with a partial core with fuel assemblies 1010 and gradually transition to a full core of fuel assemblies 1010).

Moreover, the fissile loading of assemblies 1010 can be tailored to the particular transition desired by a plant operator. For example, the fissile loading can be increased appropriately so as to increase the thermal output of the reactor by anywhere from 0% to 30% or more, relative to the use of conventional fuel assemblies that the assemblies 1010 replace. Consequently, the power plant operator can chose the specific power uprate desired, based on the existing plant infrastructure or the capabilities of the power plant at various times during upgrades.

One or more embodiments of the fuel assemblies 1010 and fuel elements 1020 may be used in fast reactors (as opposed to light water reactors) without deviating from the scope of the present invention. In fast reactors, the non-fuel metal of the fuel kernel 1100 is preferably a refractory metal, for example a molybdenum alloy (e.g., pure molybdenum or a combination of molybdenum and other metals), and the cladding 1120 is preferably stainless steel (which includes any alloy variation thereof) or other material suitable for use with coolant in such reactors (e.g., sodium). Such fuel elements 1020 may be manufactured via the above-discussed co-extrusion process or may be manufactured by any other suitable method.

Figure 16A:
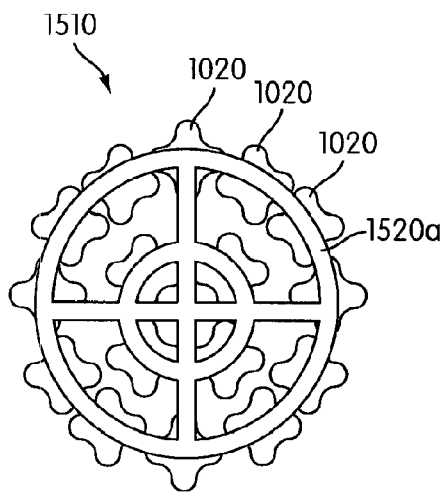
FIG. 16A is an end view of a fuel assembly according to an alternative embodiment, for use in a pressurized heavy water reactor.
Figure 16B:
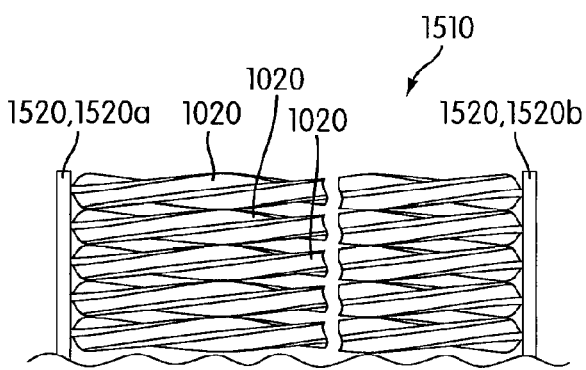
FIG. 16B is a partial side view of the fuel assembly of FIG. 16A.
Figure 17:
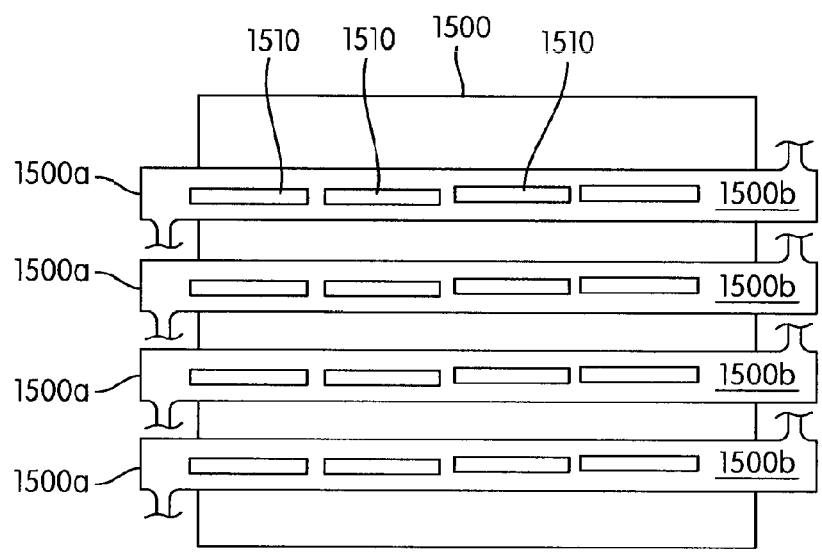
FIG. 17 is a diagram of a pressurized heavy water reactor using the fuel assembly illustrated in FIGS. 16A and 16B.

As shown in FIGS. 16A, 16B, and 17, fuel assemblies 1510 accordingly to one or more embodiments of the present invention may be used in a pressurized heavy water reactor 500 (see FIG. 17) such as a CANDU reactor.

As shown in FIGS. 16A and 16B, the fuel assembly 1510 comprises a plurality of fuel elements 1020 mounted to a frame 1520. The frame 1520 comprises two end plates 520*a*, 520*b* that mount to opposite axial ends of the fuel elements 1020 (e.g., via welding, interference fits, any of the various types of attachment methods described above for attaching the elements 1020 to the lower tie plate 1070). The elements 1020 used in the fuel assembly 1510 are typically much shorter than the elements 1020 used in the assembly 1010. According to various embodiments and reactors 1500, the elements 1020 and assemblies 1510 used in the reactor 500 may be about 18 inches long.

The elements 1020 may be positioned relative to each other in the assembly 1510 so that self-spacing planes maintain spacing between the elements 1020 in the manner described above with respect to the assembly 1010. Alternatively, the elements 1020 of the assembly 1510 may be so spaced from each other that adjacent elements 1020 never touch each other, and instead rely entirely on the frame 1520 to maintain element 1020 spacing. Additionally, spacers may be attached to the elements 1020 or their ribs at various positions along the axial length of the elements 1020 to contact adjacent elements 1020 and help maintain element spacing (e.g., in a manner similar to how spacers are used on conventional fuel rods of conventional fuel assemblies for pressurized heavy water reactors to help maintain rod spacing).

As shown in FIG. 17, the assemblies 1510 are fed into calandria tubes 1500*a* of the reactor 1500 (sometimes referred to in the art as a calandria 1500). The reactor 1500 uses heavy water 1500*b* as a moderator and primary coolant. The primary coolant 1500*b* circulates horizontally through the tubes 1500*a* and then to a heat exchanger where heat is transferred to a secondary coolant loop that is typically used to generate electricity via turbines. Fuel assembly loading mechanisms (not shown) are used to load fuel assemblies 1510 into one side of the calandria tubes 1500*a* and push spent assemblies 1510 out of the opposite side of the tubes 1500*a*, typically while the reactor 1500 is operating.

The fuel assemblies 1510 may be designed to be a direct substitute for conventional fuel assemblies (also known as fuel bundles in the art) for existing, conventional pressurized heavy water reactors (e.g., CANDU reactors). In such an embodiment, the assemblies 1510 are fed into the reactor 1500 in place of the conventional assemblies/bundles. Such fuel assemblies 1510 may be designed to have neutronic/thermal properties similar to the conventional assemblies being replaced. Alternatively, the fuel assemblies 1510 may be designed to provide a thermal power uprate. In such uprate embodiments, new or upgraded reactors 1500 can be designed to accommodate the higher thermal output.

The fuel assemblies 1010, 1510 are preferably thermodynamically designed for and physically shaped for use in a land-based nuclear power reactor 1090, 1500 (e.g., land-based LWRS (including BWRs and PWRs), land-based fast reactors, land-based heavy water reactors) that is designed to generate electricity and/or heat that is used for a purpose other than electricity (e.g., desalinization, chemical processing, steam generation, etc.). Such land-based nuclear power reactors 1090 include, among others, VVER, AP-1000, EPR, APR-1400, ABWR, BWR-6, CANDU, BN-600, BN-800, Toshiba 4S, Monju, etc.

The foregoing illustrated embodiments are provided to illustrate the structural and functional principles of various embodiments of the present invention and are not intended to be limiting. To the contrary, the principles of the present invention are intended to encompass any and all changes, alterations and/or substitutions within the spirit and scope of the following claims. Any one or more aspects of the various embodiments may be used without also using other aspects of such embodiments, and without deviating from the scope of the present invention. For example, while the illustrated fuel elements 10 have a spiral twist along their longitudinal axes, such spiral may be omitted. While the illustrated fuel elements 10 have a non-cylindrical cross-section, they may alternatively comprise a cylindrical cross-section. While the illustrated fuel elements 10 include a plurality of spacer ribs or lobes 16, such ribs/lobes 16 may be omitted. While the illustrated fuel elements 10 include displacers 17, such displacers may be omitted. While the illustrated fuel elements 10 are used in conjunction with a seed/blanket arrangement within a fuel assembly, the fuel elements 10 may alternatively be used in conjunction with a variety of other types of fuel assemblies and/or core designs. While the illustrated fuel assembly 2 utilizes a channel 12 and various other particular structures within a fuel assembly, such structures may be omitted and/or modified in a variety of ways to accommodate other assembly and/or core designs.

What is claimed is:

1. A fuel element for use in a fuel assembly of a nuclear reactor, the fuel element comprising:
    a kernel having a multi-lobed profile that forms spiral ribs that comprise fissionable material;
    a central metal displacer extending along a longitudinal axis of the kernel; and
    a metal cladding enclosing the kernel,
    wherein the fuel element is fabricated by joint extrusion of the displacer, kernel, and cladding through a die,
    wherein the spiral ribs have a pitch of axial twist of between 5% and 20% of a length of the fuel element.

2. The fuel element of claim 1, wherein the kernel comprises an alloy of the fissionable material and non-fissionable metal.

3. The fuel element of claim 2, wherein the fissionable material of the alloy of the kernel comprises uranium.

4. The fuel element of claim 2, wherein the non-fissionable metal of the alloy of the kernel comprises zirconium.

5. The fuel element of claim 1, wherein the kernel has a uranium fraction of greater than 0% by volume and 30% or less by volume, with the said uranium being enriched to greater than 0% by weight of the uranium isotope U-235 and enriched to 20% or less by weight of the uranium isotope U-235.

6. The fuel element of claim 1, wherein the kernel comprises reactor-grade plutonium with a fraction of 30% or less by volume of the kernel and greater than 0% by volume of the kernel.

7. The fuel element of claim 1, wherein the cladding comprises zirconium.

8. The fuel element of claim 7, wherein the cladding encloses the entire kernel in at least 0.3 mm of cladding.

9. The fuel element of claim 1, wherein the cladding is metallurgically bonded to the kernel.

10. The fuel element of claim 1, wherein the displacer comprises zirconium.

11. The fuel element of claim 1, wherein the displacer comprises spiral projections that extend laterally outward and are aligned with respective spiral ribs.

12. The fuel element of claim 11, wherein the plurality of spiral ribs comprise circumferentially equally-spaced ribs, and wherein a cross sectional shape of the displacer has the form of a regular polygon having a corner for each of said ribs.

13. The fuel element of claim 12, wherein the apexes of the regular polygon are aligned with the spiral ribs of the kernel.

14. The fuel element of claim 1, wherein the profile includes three ribs.

15. The fuel element of claim 1, in combination with a land-based nuclear reactor, wherein the fuel element is disposed in the reactor.

16. The fuel element of claim 1, in combination with a fuel assembly comprising a frame that supports a plurality of fuel elements according to claim 1.

17. The fuel element of claim 1, in combination with a land-based nuclear reactor, wherein:
    the fuel element is disposed in the reactor,
    the kernel comprises zirconium,
    the fissionable material of the kernel comprises uranium at a volume fraction of greater than 0% of the kernel and 30% or less of the kernel and an enrichment of greater than 0% by uranium isotope U-235 and an enrichment of 20% or less by uranium isotope U-235,
    the cladding comprises zirconium,
    wherein the displacer comprises zirconium, and
    wherein the displacer comprises spiral projections that extend laterally outward and are aligned with respective spiral ribs.

18. A fuel assembly for use in a nuclear reactor, the fuel assembly comprising:
    a frame configured to be removably disposed in a nuclear reactor; and
    a plurality of fuel elements supported by the frame,
    wherein at least some of the plurality of fuel elements each comprise:
        a kernel having a multi-lobed profile that forms spiral ribs that comprise fissionable material,
        a central metal displacer extending along a longitudinal axis of the kernel, and
        a metal cladding enclosing the kernel,
        wherein the at least some of the plurality of fuel elements are each fabricated by joint extrusion of the displacer, kernel, and cladding through a die.

19. The assembly of claim 18 in combination with a land-based nuclear reactor, wherein the fuel assembly is disposed in the reactor.

20. The assembly of claim 18, wherein the at least some of the plurality of elongated metal fuel elements provide at least 70% by volume of the overall fissile material of the fuel assembly.

21. The assembly of claim 18, wherein the metal cladding of the at least some of the plurality of fuel elements comprises zirconium.

22. The assembly of claim 18, wherein the kernel of the at least some of the plurality of fuel elements comprises U—Zr metal.

23. The assembly of claim 18, the fissionable material of the kernel comprises uranium at a volume fraction of greater than 0% of the kernel and 30% or less of the kernel and an enrichment of greater than 0% by uranium isotope U-235 and an enrichment of 20% or less by uranium isotope U-235.

24. The assembly of claim 18, wherein the cladding is metallurgically bonded to the kernel.

25. A method of manufacturing a fuel element for use in a nuclear reactor, the method comprising:
    joint extruding a kernel, a central metal displacer, and a cladding through a die to form the fuel element,
    wherein, after said extruding, the kernel has a multi-lobed profile that forms spiral ribs that comprise fissionable material;
    wherein, after said extruding, the displacer extends along a longitudinal axis of the kernel; and
    wherein, after said extruding, the metal cladding encloses the kernel,
    wherein, after said extruding, the spiral ribs have a pitch of axial twist of between 5% and 20% of a length of the fuel element.

26. The method of claim 25, further comprising positioning the fuel element in a reactor of a land-based nuclear reactor.

27. The method of claim 25, wherein the cladding comprises zirconium.

28. The method of claim 25, wherein the kernel comprises U—Zr metal.

29. The method of claim 25, wherein said extruding results in the kernel being metallurgically bonded to the cladding.

* * * * *

UNITED STATES PATENT AND TRADEMARK OFFICE
CERTIFICATE OF CORRECTION

PATENT NO. : 8,654,917 B2  Page 1 of 1
APPLICATION NO. : 13/047168
DATED : February 18, 2014
INVENTOR(S) : Bashkirtsev et al.

It is certified that error appears in the above-identified patent and that said Letters Patent is hereby corrected as shown below:

On The Title Page, please insert

--(30) Foreign Application Priority Data

December 26, 2007    (PCT)        PCT/RU2007/000732--

Signed and Sealed this
Ninth Day of December, 2014

Michelle K. Lee
*Deputy Director of the United States Patent and Trademark Office*